US 9,174,388 B2

(12) United States Patent
Batchelder et al.

(10) Patent No.: US 9,174,388 B2
(45) Date of Patent: Nov. 3, 2015

(54) DRAW CONTROL FOR EXTRUSION-BASED ADDITIVE MANUFACTURING SYSTEMS

(75) Inventors: J. Samuel Batchelder, Somers, NY (US); Ronald G. Schloesser, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 513 days.

(21) Appl. No.: 13/587,006

(22) Filed: Aug. 16, 2012

(65) Prior Publication Data

US 2014/0048970 A1   Feb. 20, 2014

(51) Int. Cl.
*B29C 47/06* (2006.01)
*B29C 67/00* (2006.01)
B29C 47/00 (2006.01)
B29C 47/02 (2006.01)
B29C 47/08 (2006.01)

(52) U.S. Cl.
CPC ......... *B29C 67/0055* (2013.01); *B29C 47/0009* (2013.01); *B29C 47/02* (2013.01); *B29C 47/065* (2013.01); *B29C 47/0866* (2013.01); *B29C 2947/92076* (2013.01); *B29C 2947/92409* (2013.01); *B29C 2947/92571* (2013.01); *B29C 2947/92904* (2013.01)

(58) Field of Classification Search
CPC .................................................. B29C 67/0055
USPC ............................ 264/241, 308; 700/118, 119
See application file for complete search history.

(56) References Cited

U.S. PATENT DOCUMENTS

| 5,121,329 A | 6/1992 | Crump ........................... 364/468 |
| 5,169,081 A | 12/1992 | Goedderz ....................... 242/54 |
| 5,303,141 A * | 4/1994 | Batchelder et al. ............. 700/29 |
| 5,312,224 A | 5/1994 | Batchelder et al. ............. 415/73 |
| 5,340,433 A | 8/1994 | Crump ........................... 156/578 |
| 5,503,785 A | 4/1996 | Crump et al. .................. 264/40.7 |
| 5,738,817 A | 4/1998 | Danforth et al. ............... 264/603 |
| 5,764,521 A | 6/1998 | Batchelder et al. ...... 364/475.01 |
| 5,866,058 A | 2/1999 | Batchelder et al. ........... 264/237 |
| 5,900,207 A | 5/1999 | Danforth et al. ............... 264/603 |
| 5,939,008 A | 8/1999 | Comb et al. ................... 264/308 |
| 5,968,561 A | 10/1999 | Batchelder et al. ........... 425/375 |

(Continued)

FOREIGN PATENT DOCUMENTS

| GB | 816016 | 7/1959 |
| JP | 2004148198 | 5/2004 |

(Continued)

OTHER PUBLICATIONS

U.S. Appl. No. 13/334,910, filed Dec. 22, 2011, entitled "Spool Assembly for Additive Manufacturing System, and Methods of Manufacture and Use Thereof".

(Continued)

*Primary Examiner* — Galen Hauth

(74) *Attorney, Agent, or Firm* — Westman, Champlin & Koehler, P.A.

(57) ABSTRACT

A method for improving part quality for a printed three-dimensional part, the method comprising moving a print head nozzle along a substantially linear segment of a tool path at a tip height above a previous layer of the three-dimensional part while extruding a flowable material, and producing an extruded road from the extruded flowable material having a road height above the previous layer, where the tip height is greater than the road height due at least in part to draw on the extruded road.

19 Claims, 13 Drawing Sheets

(56) References Cited

U.S. PATENT DOCUMENTS

| | | | |
|---|---|---|---|
| 5,975,493 A | 11/1999 | Ellingson et al. | |
| 6,004,124 A | 12/1999 | Swanson et al. | 425/375 |
| 6,022,207 A | 2/2000 | Dahlin et al. | 425/145 |
| 6,054,077 A | 4/2000 | Comb et al. | 264/40.7 |
| 6,067,480 A | 5/2000 | Stuffle et al. | 700/109 |
| 6,070,107 A | 5/2000 | Lombardi et al. | 700/119 |
| 6,085,957 A | 7/2000 | Zinniel et al. | 226/8 |
| 6,129,872 A | 10/2000 | Jang | 264/75 |
| 6,193,923 B1 | 2/2001 | Leyden et al. | |
| 6,228,923 B1 | 5/2001 | Lombardi et al. | 524/425 |
| 6,257,517 B1 | 7/2001 | Babish et al. | 242/365.6 |
| 6,505,089 B1 | 1/2003 | Yang et al. | |
| 6,547,995 B1 | 4/2003 | Comb | 264/40.1 |
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 | 9/2004 | Priedeman, Jr. et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,998,087 B1 | 2/2006 | Hanson et al. | 264/308 |
| 7,122,246 B2 | 10/2006 | Comb et al. | 428/364 |
| 7,172,715 B2 | 2/2007 | Swanson et al. | 264/39 |
| 7,236,166 B2 | 6/2007 | Zinniel et al. | 345/419 |
| 7,384,255 B2 | 6/2008 | LaBossiere et al. | 425/190 |
| 7,604,470 B2 | 10/2009 | LaBossiere et al. | 425/131.1 |
| 7,625,200 B2 | 12/2009 | Leavitt | 425/375 |
| 7,896,209 B2 | 3/2011 | Batchelder et al. | 26/53 |
| 7,938,351 B2 | 5/2011 | Taatjes et al. | 242/171 |
| 7,938,356 B2 | 5/2011 | Taatjes et al. | 242/580 |
| 8,033,811 B2 | 10/2011 | Swanson et al. | 425/375 |
| 8,153,182 B2 | 4/2012 | Comb et al. | 427/8 |
| 8,221,669 B2 | 7/2012 | Batchelder et al. | 264/308 |
| 2004/0182510 A1 | 9/2004 | Pfeifer et al. | |
| 2005/0129941 A1 | 6/2005 | Comb et al. | 428/364 |
| 2007/0003656 A1 | 1/2007 | LaBossiere et al. | 425/375 |
| 2007/0228590 A1 | 10/2007 | LaBossiere et al. | 264/40.1 |
| 2009/0035405 A1 | 2/2009 | Leavitt | 425/97 |
| 2009/0263582 A1 | 10/2009 | Batchelder | 427/256 |
| 2009/0273122 A1 | 11/2009 | Batchelder et al. | 264/401 |
| 2009/0274540 A1 | 11/2009 | Batchelder et al. | 414/431 |
| 2010/0096072 A1 | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0283172 A1 | 11/2010 | Swanson | 264/80 |
| 2010/0327479 A1 | 12/2010 | Zinniel et al. | 264/172.14 |
| 2011/0074065 A1 | 3/2011 | Batchelder et al. | 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0233804 A1 | 9/2011 | Batchelder et al. | 264/40.4 |
| 2012/0067501 A1 | 3/2012 | Lyons | 156/64 |
| 2012/0068378 A1 | 3/2012 | Swanson et al. | 264/308 |
| 2012/0070523 A1 | 3/2012 | Swanson et al. | 425/96 |
| 2012/0162314 A1 | 6/2012 | Swanson et al. | 347/37 |
| 2012/0164256 A1 | 6/2012 | Swanson et al. | 425/162 |

FOREIGN PATENT DOCUMENTS

| | | |
|---|---|---|
| KR | 20080072788 | 8/2008 |
| KR | 20120060240 | 6/2012 |

OTHER PUBLICATIONS

U.S. Appl. No. 13/334,921, filed Dec. 22, 2011, entitled "Consumable Assembly with Payout Tube for Additive Manufacturing System".

www.envisiontec.com, "3D-Bioplotter", Datasheet, Mar. 2011.

* cited by examiner

FIG. 9A
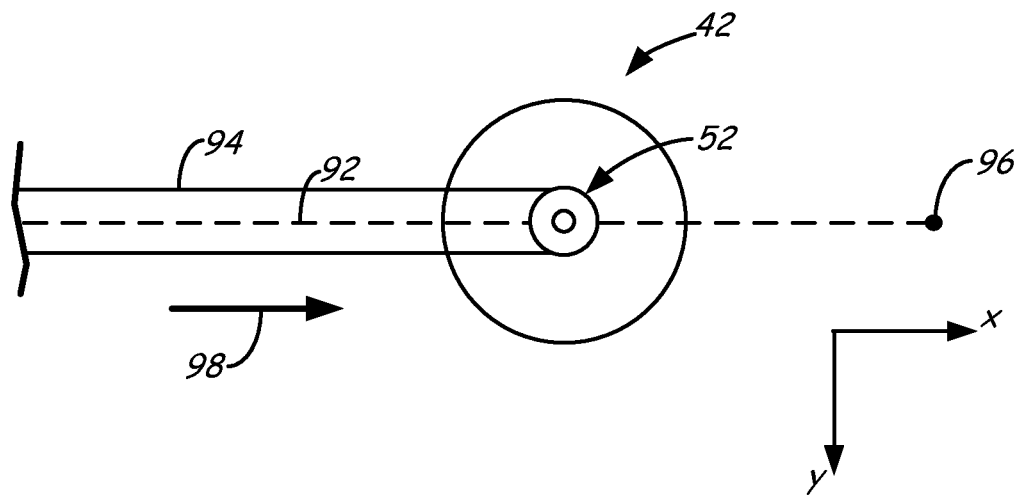
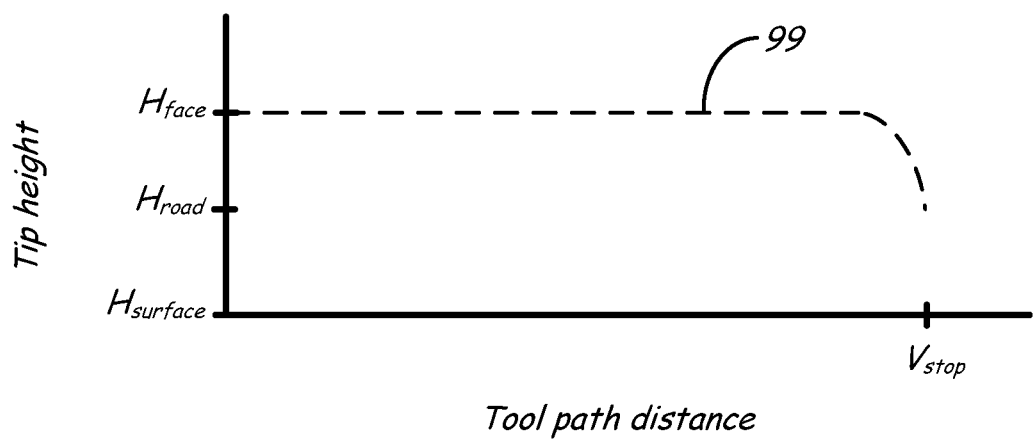
FIG. 9B

FIG. 10A
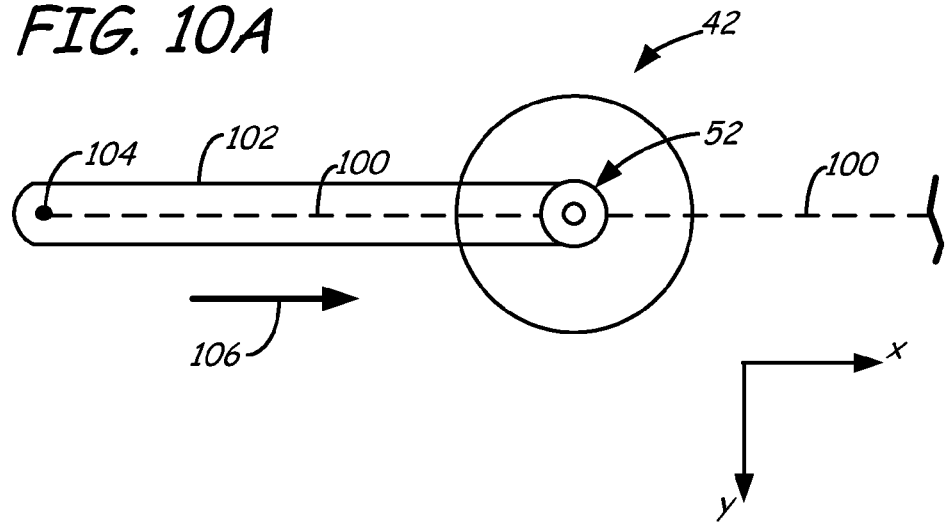
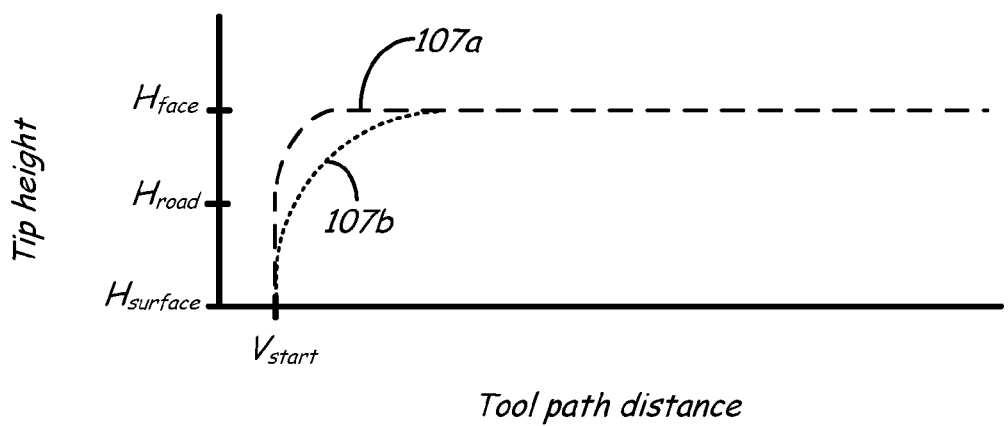
FIG. 10B

DRAW CONTROL FOR EXTRUSION-BASED ADDITIVE MANUFACTURING SYSTEMS

CROSS-REFERENCE TO RELATED APPLICATION(S)

Reference is hereby made to co-filed U.S. patent application Ser. No. 13/587,002, entitled "Print Head Nozzle For Use With Additive Manufacturing System", the disclosure of which is incorporated by reference in its entirety to the extent that it does not conflict with the present disclosure.

Reference is also hereby made to co-filed U.S. patent application Ser. No. 13/587,009, entitled "Additive Manufacturing System With Extended Printing Volume, And Methods Of Use Thereof".

Reference is also hereby made to co-filed U.S. patent application Ser. No. 13/587,012, entitled "Method For Printing Three-Dimensional Parts With Additive Manufacturing Systems Using Scaffolds".

Reference is also hereby made to co-filed U.S. patent application Ser. No. 13/587,015, entitled "Additive Manufacturing Technique For Printing Three-Dimensional Parts With Printed Receiving Surfaces".

BACKGROUND

The present disclosure relates to additive manufacturing systems for building three-dimensional (3D) parts with layer-based, additive manufacturing techniques. In particular, the present disclosure relates to extrusion control techniques for extrusion-based additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, one or more tool paths are then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip or nozzle carried by a print head of the system, and is deposited as a sequence of roads on a substrate in an x-y plane while the print head moves along the tool paths. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for improving part quality for a printed 3D part. The method includes providing a print head retained by an extrusion-based additive manufacturing system, where the print head has a nozzle, and moving the nozzle along a substantially linear segment of a tool path at a tip height above a previous layer of the 3D part while extruding a flowable material. The method also includes producing an extruded road from the extruded flowable material having a road height above the previous layer, where the tip height is greater than the road height (e.g., ranging from about 150% to about 250% of the road height) due at least in part to draw on the extruded road, wherein the printed 3D part is substantially free of surface cresting.

Another aspect of the present disclosure is directed to a method for improving part quality for a printed 3D part, which includes providing a print head retained by the extrusion-based additive manufacturing system, where the print head includes a nozzle. The method also includes moving the nozzle along a tool path at a first tip height above a previous layer of the 3D part, and extruding a flowable material from the nozzle moving at the first tip height to produce a first portion of an extruded road having a first amount of draw. The method further includes lowering the nozzle from the first tip height to a second tip height above the previous layer, moving the nozzle along the tool path at the second tip height, and extruding the flowable material from the nozzle moving at the second tip height to produce a second portion of the extruded road having a second amount of draw than the first amount of draw or substantially no draw.

Another aspect of the present disclosure is directed to a method for improving part quality for a printed 3D part, where the method includes a feedback technique. The method includes providing a print head retained by an extrusion-based additive manufacturing system, where the print head has a nozzle, and moving the nozzle along a tool path above a previous layer of the 3D part. The method also includes extruding a flowable material from the moving nozzle to produce an extruded road, sensing draw levels of the extruded road, and adjusting at least one extrusion setting based on the sensed draw levels. The at least one extrusion setting is selected from the group consisting of a height of the moving nozzle, a velocity of the moving nozzle, and a volumetric flow rate of the flowable material extruded from the nozzle.

DEFINITIONS

Unless otherwise specified, the following terms as used herein have the meanings provided below:

The terms "about" and "substantially" are used herein with respect to measurable values and ranges due to expected variations known to those skilled in the art (e.g., limitations and variabilities in measurements).

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head" and the like, when recited in the claims, is not intended to require any particular delivery or receipt of the provided item. Rather, the term "providing" is merely used to recite items that will be referred to in subsequent elements of the claim(s), for purposes of clarity and ease of readability.

BRIEF DESCRIPTION OF THE DRAWINGS

FIG. 9A is a bottom view of the nozzle producing an extruded road along a tool path having a stop vertex.

FIG. 9B is a graphical illustration of tip height versus tool path distance for the example shown in FIG. 9A.

FIG. 10A is a bottom view of the nozzle producing an extruded road along a tool path having a start vertex.

FIG. 10B is a graphical illustration of tip height versus tool path distance for the example shown in FIG. 10A.

DETAILED DESCRIPTION

The present disclosure is directed to a system and method for controlling draw of extruded roads while printing 3D parts and/or support structures with extrusion-based additive manufacturing systems, to improve part quality. As discussed below, draw is believed to be dependent on the shear between a bottom face of a nozzle and the surface of a previous layer. Draw can reduce the height of an extruded road, which can positively or negatively affect surface quality of a resulting 3D part or support structure depending on the particular tool path geometry for the extruded road.

For some tool paths, such as linear tool paths, a high amount of draw is desirable to reduce surface ripples and cresting, to reduce the effects of flow rate errors, to reduce tip following errors, and the like. However, as the curvatures or deflections of the tool paths increase, such as around corners, the amount of draw is desirably reduced to minimize its impact on the curved or deflected roads. As such, changing the draw based on the tool path geometries can improve part quality, such as by providing consistent road heights, sharper corners, greater deposition accuracies, and the like.

Figure 1:
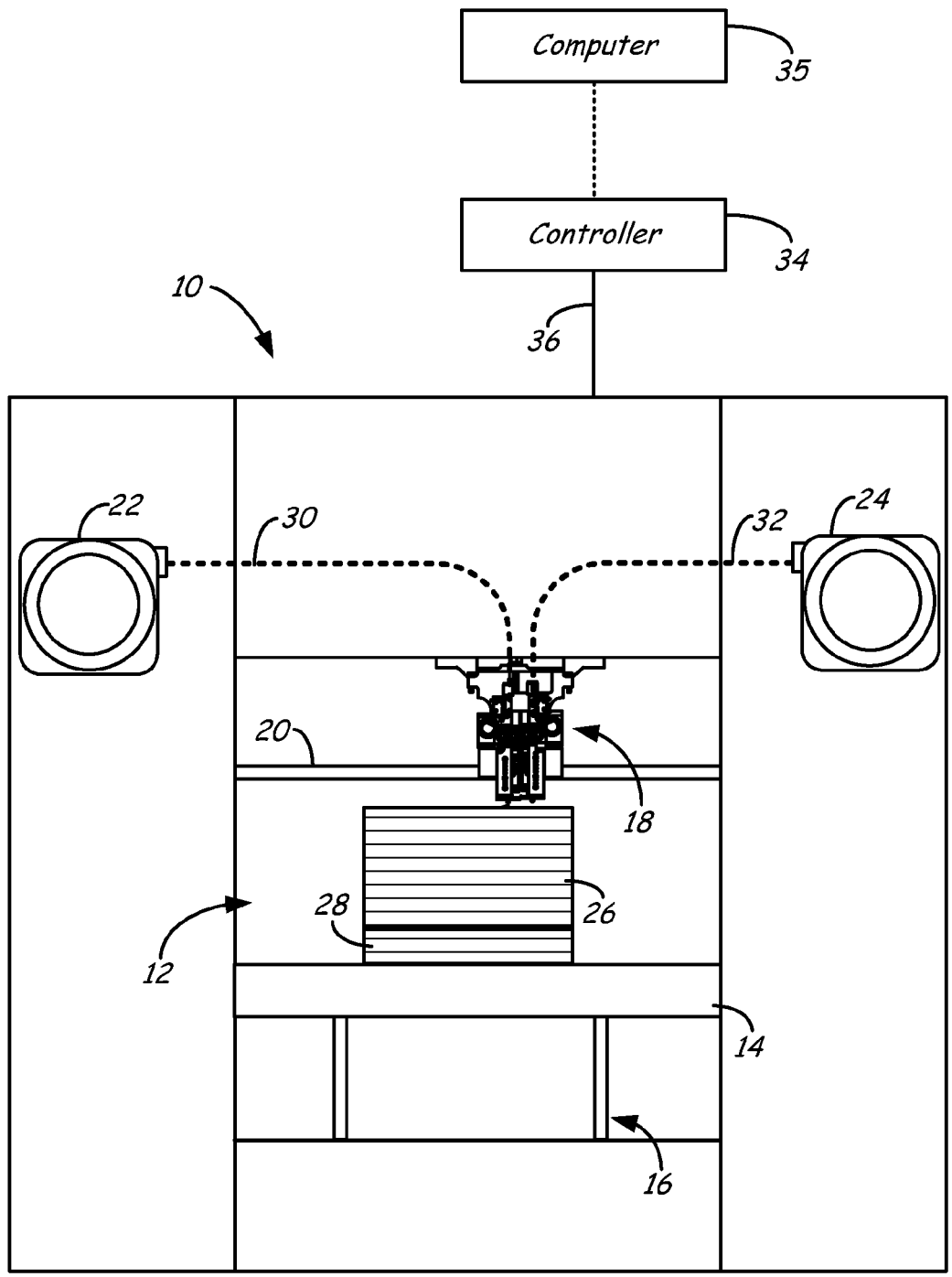
FIG. 1 is a front view of an extrusion-based additive manufacturing system configured to print 3D parts and support structures with the draw control technique of the present disclosure.

FIG. 1 illustrates system 10, which is an example of a suitable extrusion-based additive manufacturing system for printing or otherwise building 3D parts and/or support structures using a layer-based, additive manufacturing technique, with the draw control method of the present disclosure. Suitable systems for system 10 include extrusion-based additive manufacturing systems developed by Stratasys, Inc., Eden Prairie, Minn. under the trademarks "FDM" and "FUSED DEPOSITION MODELING".

In the shown embodiment, system 10 includes chamber 12, platen 14, platen gantry 16, print head 18, head gantry 20, and consumable assemblies 22 and 24. Chamber 12 is an enclosed environment that contains platen 14 for printing 3D parts (e.g., 3D part 26) and support structures (e.g., support structure 28). Chamber 12 may be heated (e.g., with circulating heated air) to reduce the rate at which the part and support materials solidify after being extruded and deposited (e.g., to reduce distortions and curling). In alternative embodiments, chamber 12 may be omitted and/or replaced with different types of build environments. For example, 3D part 26 and support structure 28 may be built in a build environment that is open to ambient conditions or may be enclosed with alternative structures (e.g., flexible curtains).

Platen 14 is a platform on which 3D part 26 and support structure 28 are printed in a layer-by-layer manner. In some embodiments, platen 14 may also include a flexible polymeric film or liner on which 3D part 26 and support structure 28 are printed. In the shown example, print head 18 is a dual-tip extrusion head configured to receive consumable filaments from consumable assemblies 22 and 24 (e.g., via guide tubes 30 and 32) for printing 3D part 26 and support structure 28 on platen 14.

Platen 14 is supported by platen gantry 16, which is a gantry assembly configured to move platen 14 along (or substantially along) a vertical z-axis Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D part 26 and support structure 28 along the x-axis or the y-axis.

Suitable devices for consumable assemblies 22 and 24 include those disclosed in Swanson et al., U.S. Pat. No. 6,923,634; Comb et al., U.S. Pat. No. 7,122,246; Taatjes et al, U.S. Pat. Nos. 7,938,351 and 7,938,356; Swanson, U.S. Patent Application Publication No. 2010/0283172; and Mannella et al., U.S. patent application Ser. Nos. 13/334,910 and 13/334,921.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

In some embodiments, controller 34 may also communicate with one or more of platen 14, platen gantry 16, head gantry 20, and any other suitable component of system 10. While illustrated as a single signal line, communication line 36 may include one or more electrical, optical, and/or wireless signal lines, allowing controller 34 to communicate with various components of system 10. Furthermore, while illustrated outside of system 10, controller 34 and communication line 36 are desirably internal components to system 10.

System 10 and/or controller 34 may also communicate with computer 35, which is one or more computer-based systems that communicates with system 10 and/or controller 34, and may be separate from system 10, or alternatively may be an internal component of system 10. Computer 35 includes computer-based hardware, such as data storage devices, processors, memory modules and the like for generating and storing tool path and related printing instructions. Computer 35 may transmit these instructions to system 10 (e.g., to controller 34) to perform printing operations.

Figure 2:
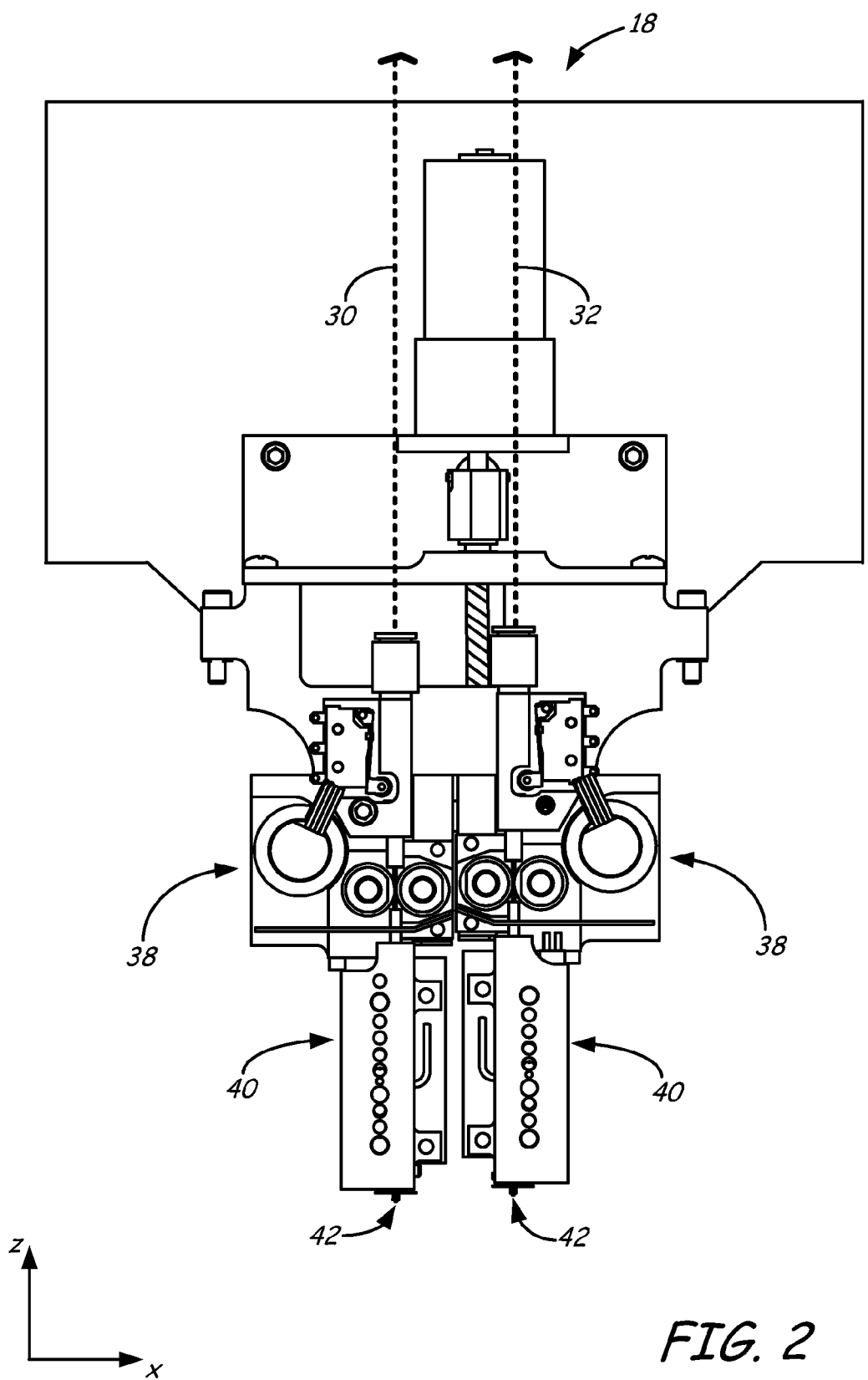
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

In additional embodiments, in which print head 18 is an interchangeable, single-nozzle print head, examples of suitable devices for each print head 18, and the connections between print head 18 and head gantry 20 include those disclosed in Swanson et al., U.S. Patent Application Publication No. 2012/0164256.

The shown dual-tip embodiment for print head 18 includes two drive mechanisms 38, two liquefier assemblies 40, and two nozzles 42. During operation, controller 34 may direct drive mechanisms 38 to selectively pull successive segments of the part and support material filaments from consumable assemblies 22 and 24 (via guide tubes 30 and 32), and feed the filaments to liquefier assemblies 40. Liquefier assemblies 40 thermally melt the successive segments of the received filaments such that they become molten flowable materials. The molten flowable materials are then extruded and deposited from nozzles 42 onto platen 14 for printing 3D part 26 (from the part material) and support structure 28 (from the support material).

Suitable materials and filaments for use with print head 18 include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication Nos. 2009/0263582, 2011/0076496, 2011/0076495, 2011/0117268, 2011/0121476, and 2011/0233804; and Hopkins et al., U.S. Patent Application Publication No. 2010/0096072. Examples of suitable average diameters for the filaments range from about 1.02 millimeters (about 0.040 inches) to about 3.0 millimeters (about 0.120 inches).

Figure 3:
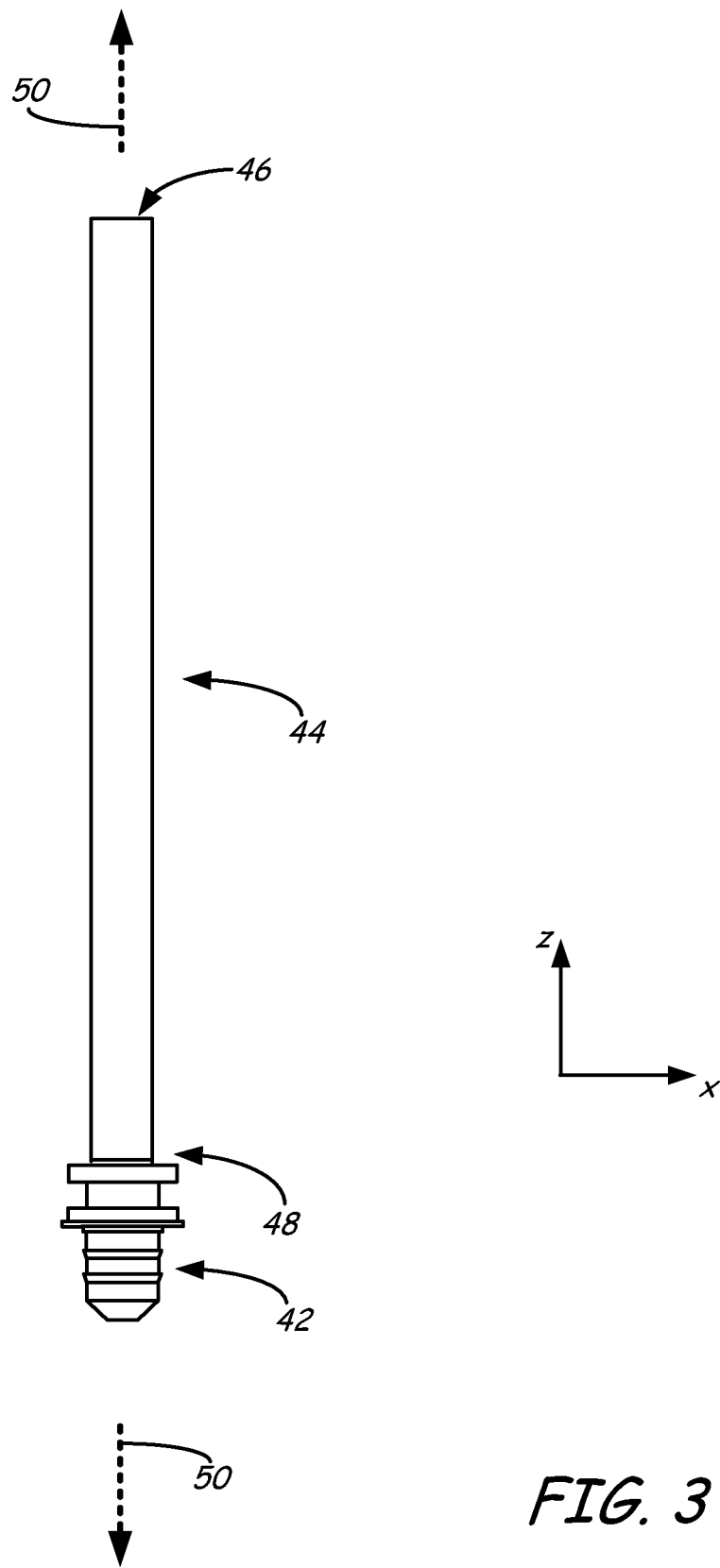
FIG. 3 is a front view of a liquefier tube and nozzle of the print head.

FIG. 3 illustrates nozzle 42 secured to liquefier tube 44, where liquefier tube 44 is a sub-component of liquefier assembly 40. Liquefier tube 44 is an example of a suitable device having a flow channel for delivering flowable part or support materials to nozzle 42, and includes inlet end 46 and outlet end 48 offset along longitudinal axis 50. In alternative embodiments, nozzle 42 may be used with a variety of different flow channels (e.g., non-tube-based liquefiers). In further alternative embodiments, liquefier assembly 232 may have a non-cylindrical geometry (e.g., a ribbon liquefier for use with a ribbon filament), as disclosed in Batchelder et al., U.S. Patent Application Publication Nos. 2011/0076496 and 2011/0074065.

Nozzle 42 is a rigid structure fabricated from one or more metallic materials (e.g., stainless steel), and is secured to, or is otherwise engageable with outlet end 48 of liquefier tube 44. In some embodiments, nozzle 42 may be integrally formed with liquefier tube 44 as a sub-component of liquefier assembly 40, and may also include a tip shield (not shown).

Figure 4:
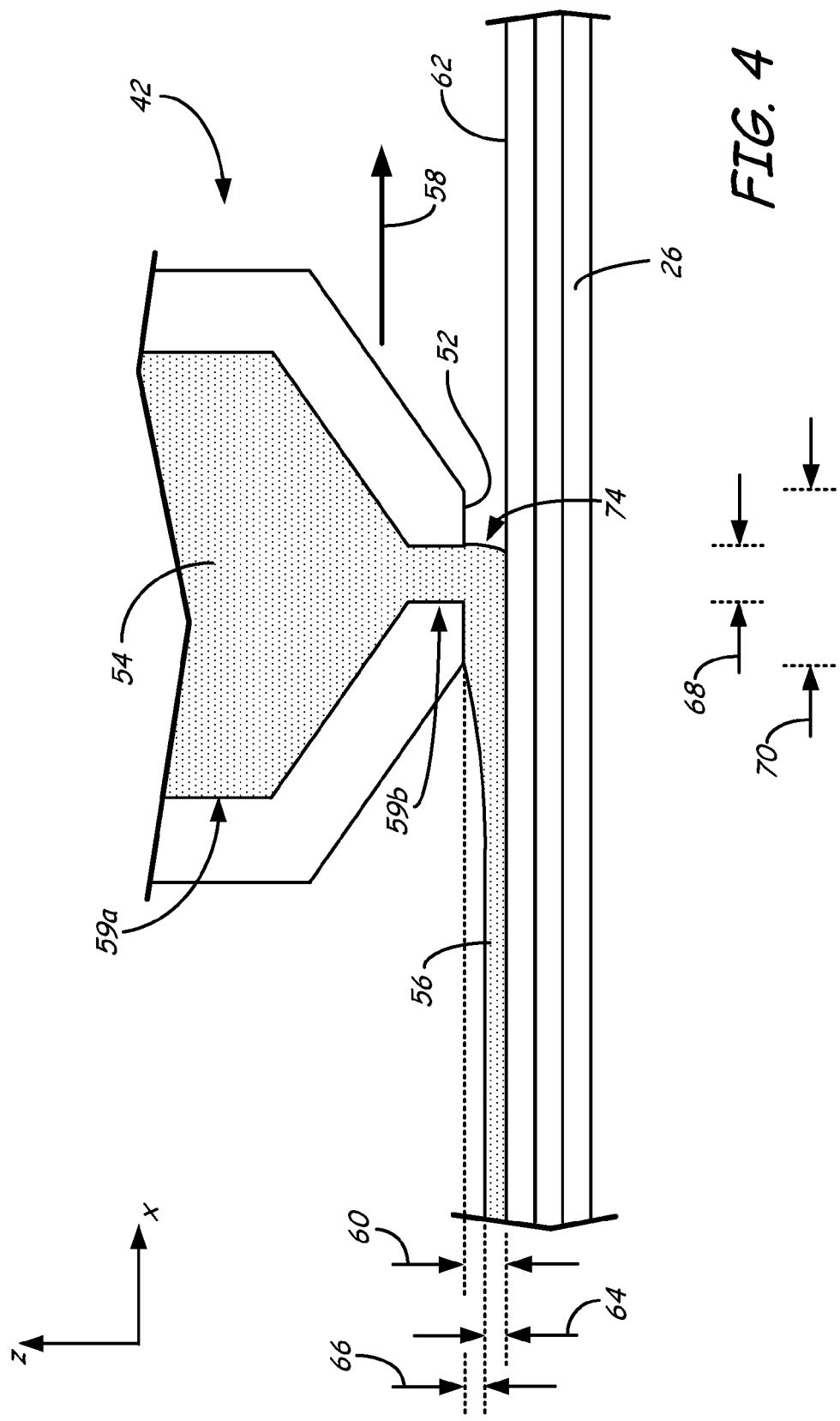
FIG. 4 is a side view of the extrusion tip producing roads in a layer-by-layer manner to print a 3D part, where the produced roads exhibit draw.

FIG. 4 shows nozzle 42, having a tip ring or annulus with planar bottom face 52, extruding flowable material 54 to produce a series of roads 56 in a layer-by-layer manner to print 3D part 26. The dimensions of road 56 (e.g., road height and width) are primarily dependent on the extrusion rate of flowable material 54 and the height of nozzle 42, where the extrusion rate of flowable material 54 itself is based on the volumetric flow rate of flowable material 54 out of nozzle 42 and the movement speed or velocity of nozzle 42, such as in the direction of arrow 58.

In the shown embodiment, nozzle 42 also includes axial channel $59a$ and tip pipe $59b$. Axial channel $59a$ extends longitudinally between an inlet end of nozzle 42 and tip pipe $59b$, and is a central conduit for receiving the flowable part or support materials from liquefier tube 44. Tip pipe $59b$ is a reduced diameter region located between axial channel $59a$ and the outlet end of nozzle 42, and can have any suitable dimensions. In one embodiment, the length-to-diameter ratio for tip pipe $59b$ is large, such as greater than 4:1. In another embodiment, the length-to-diameter ratio for tip pipe $59b$ is small, such as less as less than 2:1. Alternatively, suitable length-to-diameter ratios for tip pipe $59b$ can range from about 1:2 to greater than 5:1. Tip pipe $59b$ functions as a flow resistor, making the flow characteristics of liquefier assembly 40 or other flow channel more time-constrained and repeatable. In alternative embodiments, axial channel $59a$ may be omitted such that nozzle 42 includes tip pipe $59b$.

During a printing operation, bottom face 52 may be maintained at a tip height 60 above the surface of the previously-formed layer of 3D part 26 (referred to as surface 62). Conventionally, the height of bottom face 52 was set to correspond to a single layer increment (i.e., the intended height of road 56) above surface 62 for the 3D part or support structure. This allowed bottom face 52 to doctor the extruded material at the top of road 56 to the height of bottom face 52. As explained below, this situation can potentially generate pressure below the nozzle, which can result in roughness or asperities in the extruded roads. These asperities can compound and propagate over the layers to create surface ripples or crests in the 3D parts.

Instead, it has been found that when the height of bottom face 52 is increased above a single layer increment (i.e., above the intended height of road 56), such as to tip height 60, the extruded flowable material 54 can be controlled to draw down to a road height that is lower than tip height 60 (referred to as road height 64). This creates a draw height, which is the difference between the actual road height and the tip height, where a larger draw height corresponds to a lower road height. Thus, as shown in FIG. 4, tip height 60 is the sum of road height 64 and draw height 66.

As mentioned above, this controlled draw on road 56 is believed to be dependent on the shear between bottom face 52 and the surface of the previous layer of 3D part 26. For example, in the shown embodiment, nozzle 42 has a tip pipe diameter 68 (corresponding to an inner diameter of bottom face 52) and an outer diameter 70 of bottom face 52. The shear effect can be explained in a simplified model in which nozzle 42 has a wide slot orifice (e.g., a rectangular orifice with a length extending along a y-axis that is substantially greater than tip pipe diameter 68), and large area for the bottom face 52 (i.e., the difference between tip pipe diameter 68 and outer diameter 70) compared to tip height 60. This model allows the flow boundary layers from bottom face 52 and surface 62 to expand and merge to form a uniform shear layer.

In this model, the velocity of the extruded flowable material 54 underneath bottom face 52, referred to as "v(z)", can be represented by Equation 1:

$$v(z) = v_{tip} \frac{z}{H_{face}} \quad \text{(Equation 1)}$$

where "$v_{tip}$" is the velocity of nozzle 42, such as in the direction of arrow 58, "z" is the height of road 56, and "$H_{face}$" is the height of bottom face 52 of nozzle 42 (e.g., tip height 60). The average velocity of the extruded flowable material 54 underneath bottom face 52, referred to as "$v(z)_{ave}$", and the flow rate of the extruded flowable material 54 underneath bottom face 52 per unit width of the orifice, referred to as "$A_{flow}$", can respectively be represented by Equations 2 and 3:

$$v(z)_{ave} = \frac{v_{tip}}{2} \quad \text{(Equation 2)}$$

$$A_{flow} = \frac{(v_{tip})(H_{face})}{2} \quad \text{(Equation 3)}$$

Since nozzle 42 is moving in the direction of arrow 58 at a velocity $v_{tip}$, the final deposited height of road 56 is $H_{face}/2$, which also makes the draw equal to $H_{face}/2$. In other words, road height 64 and draw height 66 are about the same and are each about one-half of tip height 60.

Figure 5:
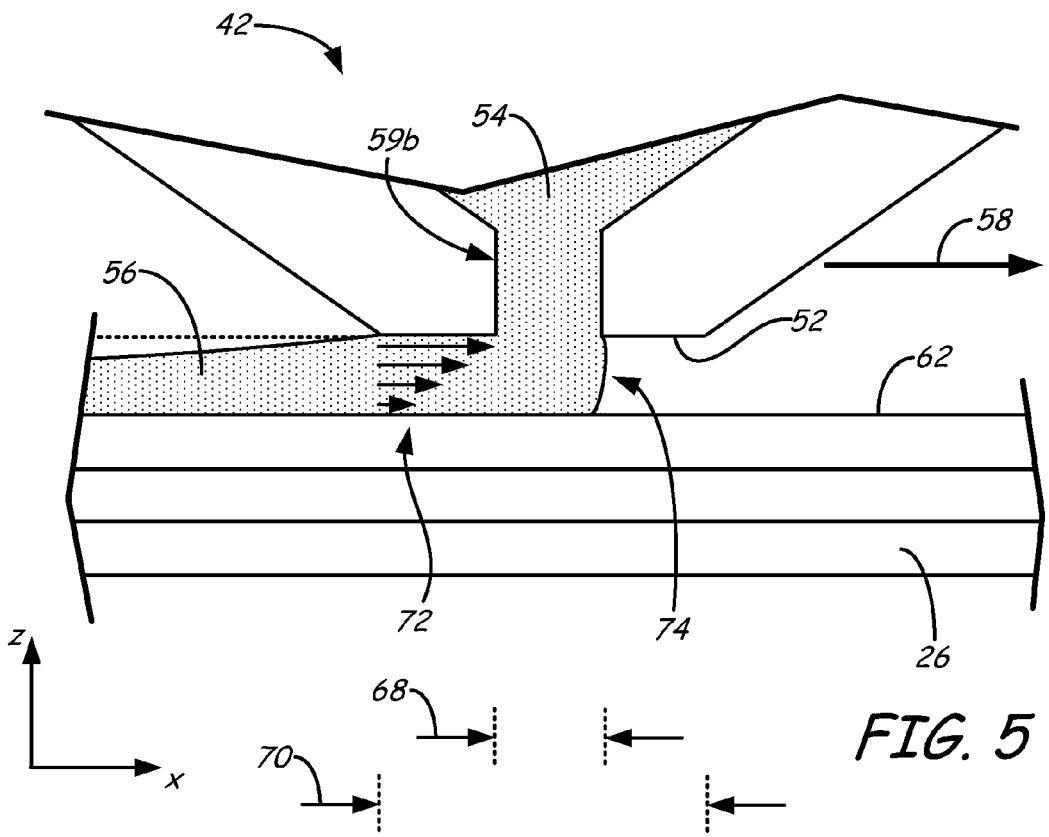
FIG. 5 is an expanded side view of the nozzle producing the roads, illustrating a natural draw rate.

This is further illustrated in FIG. 5. At bottom face 52, the extruded flowable material 54 is pulled by bottom face 52 in the direction of arrow 58, which continues behind the trailing edge of bottom face 52. However, at surface 62 of 3D part 26, the flow rate of the extruded flowable material 54 is slower, creating a linear flow gradient represented by arrows 72.

Under this linear flow gradient, the extruded flowable material 54 is sheared, which creates a viscosity pump action whose natural flow rate corresponds to a road height 64 that is about $H_{face}/2$, or about one-half of tip height 60. This corresponds to a draw height of about $H_{face}/2$, or about one-half of tip height 60. The rate at which road 56 can be controlled to draw down from tip height 60 to road height 64 may vary depending on multiple factors, such as the elasticity of flowable material 54, die swell conditions, the ambient temperature, and the like.

This natural flow rate scenario is attained when the extrusion rate of flowable material 54 from nozzle 42 is set such that substantially no positive pressure exists below nozzle 42. In other words, the pressure below nozzle 42 is at about zero gauge pressure or about atmospheric pressure. At zero gauge pressure, the leading edge of extruded road 56 below nozzle 42 (referred to as leading edge 74, also shown in FIG. 4) does not generate any push droplet, or at most, a small push droplet.

As can be appreciated from Equations 1-3 above, as the extrusion rate of flowable material 54 increases above the natural flow rate, or as the height of nozzle 42 is lowered, the pressure below nozzle 42 increases above zero gauge pressure. This increased pressure below nozzle 42 reduces the amount of draw on road 56. As such, road height 64 increases above $H_{face}/2$ and draw height 66 decreases below $H_{face}/2$.

Figure 6:
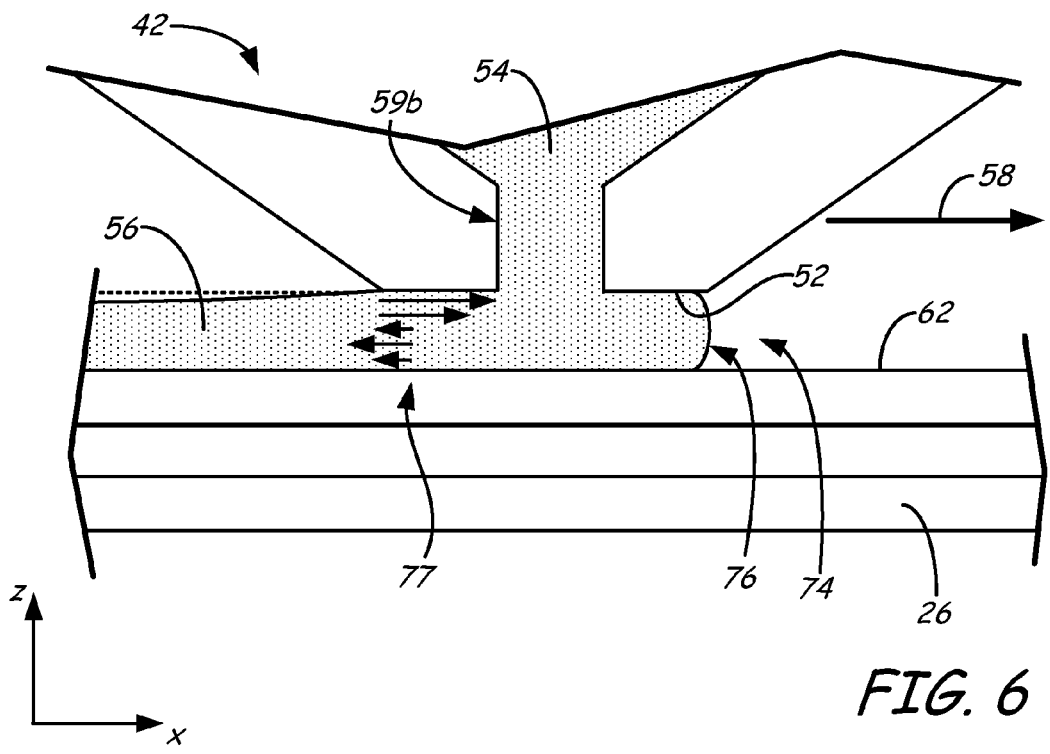
FIG. 6 is an expanded side view of the nozzle producing the roads, illustrating a reduced draw rate.

However, the increased pressure can also generate a push droplet ahead of nozzle 42 at leading edge 74, such as push droplet 76 shown in FIG. 6. In this high-push configuration, there is enough on-axis pressure under bottom face 52 that the extruded flowable material 54 is forced backwards faster than the viscosity-pump action wants to go. As illustrated by arrows 77, the extruded flowable material 54 near bottom face 52 still travels almost at the tip velocity. But below that, there is a parabolic addition to the linear velocity ramp along the z-axis. As a result, the extruded flowable material 54 near surface 62 moves slightly backwards, and the extruded flowable material 54 above that is directed backwards, which is what generates push droplet 76 and reduces the draw on road 56.

As discussed in co-filed U.S. patent application Ser. No. 13/587,002, entitled "Print Head Nozzle For Use With Additive Manufacturing System", large push droplets can lead to unstable extruded roads. If a large push droplet comes in contact with any surface asperity from a previously-formed layer of 3D part 26, the extruded material of the push droplet could be forced around the left and/or right lateral edges of bottom face 52, where it reaches a substantially lower flow resistance.

This results in a visually-apparent waviness in the extruded road, as evidenced by ripples in the sidewalls of the extruded road relative to the intended tool path. As this continues over successive layers of the 3D part, the ripples of the extruded roads accumulate to form crests at the surface of the 3D part. These crests are readily visible to the naked eye and reduce the surface qualities of the 3D part.

Thus, because tip height 60 has been conventionally set to correspond to a single layer increment above surface 62, rather than about twice the height of the layer increment (due to draw height 66 being about $H_{face}/2$ at the natural flow rate), the pressures below nozzle 42 were high enough to generate large push droplets. These large push droplets resulted in roughness or asperities in the extruded roads.

Accordingly, draw height 66 and the size of any generated push droplet (e.g., push droplet 76) are inversely proportional to each other based on the pressure of the extruded flowable material 54 below nozzle 42, which itself is dependent on the shear of the extruded flowable material 54 and bottom face 52. This is illustrated by Equations 4-6:

$$\text{Draw Height} \sim \frac{1}{(\text{Pressure}_{face})} \quad \text{(Equation 4)}$$

$$\text{Push Droplet Size} \sim \text{Pressure}_{face} \quad \text{(Equation 5)}$$

$$\text{Pressure}_{face} \sim \frac{(V_{material})}{(S_{nozzle})(H_{face})} \quad \text{(Equation 6)}$$

where "$\text{Pressure}_{face}$" is the pressure of the extruded flowable material 54 below bottom face 52, "$V_{material}$" is the volumetric flow rate of flowable material 54 from nozzle 42, "$S_{nozzle}$" is the speed or velocity of nozzle 42, such as in the direction of arrow 58, and "$H_{face}$" is the height of the bottom face 52 (e.g., tip height 60) as mentioned above, and where the "extrusion rate" of flowable material 54 from nozzle 42 is a function of $V_{material}$ and $S_{nozzle}$.

Pursuant to Equations 4-6, for a set tip height 60, increasing the extrusion rate of flowable material 54, by increasing the volumetric flow rate and/or by decreasing the tip velocity, increases the pressure below nozzle 42, which reduces draw height 66 (and increases road height 64) and correspondingly increases the size of the generated push droplet. Alternatively, reducing the extrusion rate of flowable material 54, by reducing the volumetric flow rate and/or increasing the tip velocity, reduces the pressure below nozzle 42, which increases draw height 66 (and increases road height 64) and correspondingly decreases the size of the generated push droplet.

Therefore, to provide good surface quality for 3D part 26 and/or support structure 28, the extrusion rate of flowable material 54 and tip height 60 may be set to maintain an optimal balance these competing characteristics. The "optimal balance" itself, however, may vary depending on the particular tool path geometries and the nozzles utilized, as explained below.

Draw Control with Vertex Staking

FIGS. 7A-11 illustrate a vertex staking technique for controlling draw based on the particular tool path geometries. When computer 35 (or other suitable computer-based system) generates the tool paths and related printing instructions for printing a 3D part, computer 35 may generate tool paths for each sliced layer of the 3D part. Based on the particular geometries of the generated tool paths, computer 35 may adjust the height of nozzle 42 to control the amount of draw that occurs. These preset instructions may then be transmitted to system 10 to print the 3D part with the controlled draw.

Figure 7A:
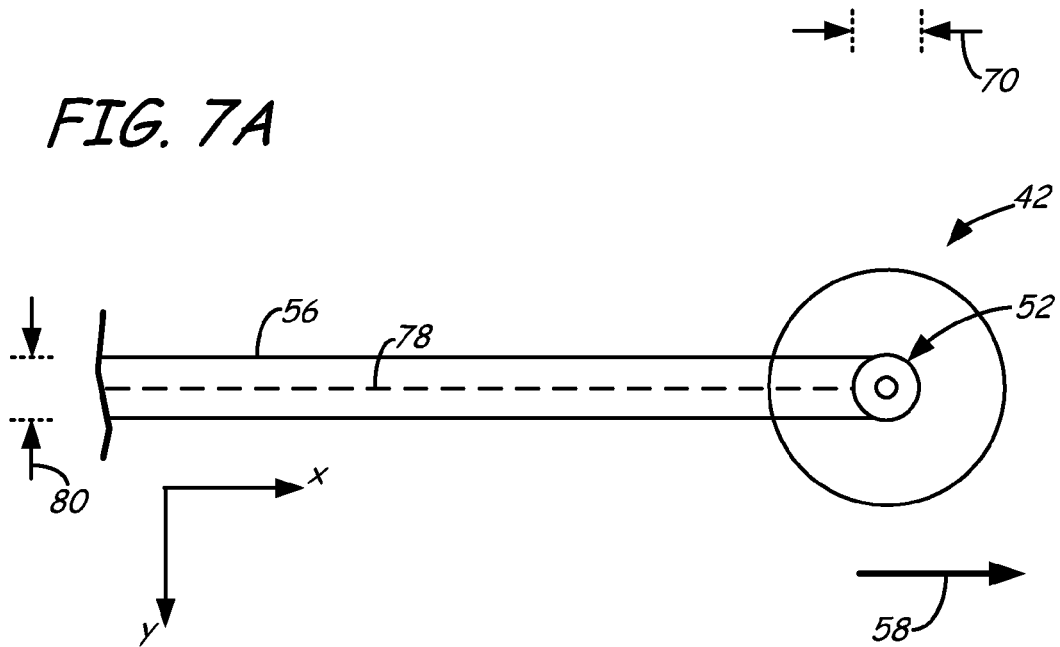
FIG. 7A is a bottom view of the nozzle producing an extruded road along a linear tool path.
Figure 7B:
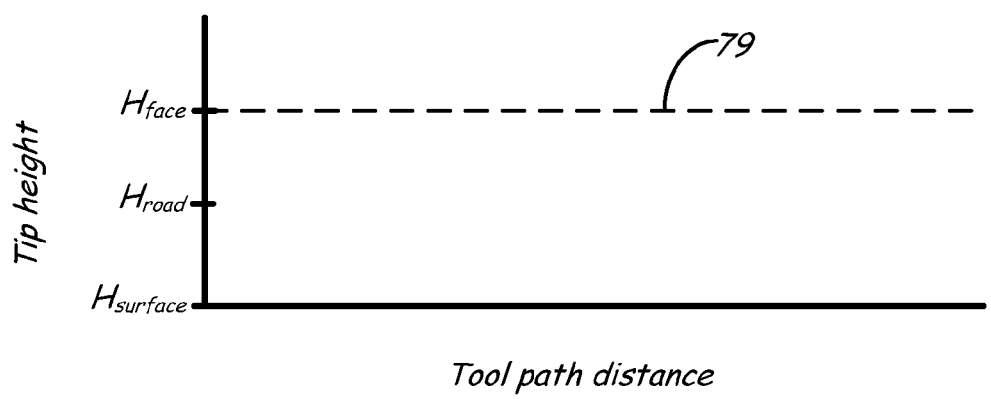
FIG. 7B is a graphical illustration of tip height versus tool path distance for the example shown in FIG. 7A.

For example, FIG. 7A illustrates nozzle 42 moving along a substantially linear segment of a tool path, referred to as tool path 78, to produce a linear road 56. In this situation, it has been found that the extrusion rate of flowable material 54 and tip height 60 are desirably set to extrude flowable material 54 at its natural flow rate. This creates a substantially zero gauge pressure below nozzle 42 while extruding flowable material 54, and the resulting road height 64 and draw height 66 are each about one-half of tip height 60.

As can be appreciated, this means that tip height 60 is set and maintained at about twice the height of the intended layer increment for 3D part 26 or support structure 28. This is depicted by a level plot line 79 in FIG. 7B, which is maintained at tip height 60 ($H_{face}$) above road height 64 ($H_{road}$) and the height of surface 62 ($H_{surface}$). In some embodiments, for a linear tool path, suitable set point heights for tip height 60 range from about 150% to about 250% of the intended layer increment, with particularly suitable set point heights ranging from about 175% to about 225% of the intended layer increment, and with even more particularly suitable set point heights ranging from about 190% to about 210% of the intended layer increment.

This large natural draw minimizes or prevents the generation of push droplets, and also reduces effects of flow rate errors and tip following errors, providing a stable road 56, having smooth, non-rippling sidewalls. As also discussed in co-filed U.S. patent application Ser. No. 13/587,002, entitled "Print Head Nozzle For Use With Additive Manufacturing System", this is particularly true when the width of road 56 (referred to as road width 80, shown in FIG. 7A) is comparable to outer diameter 70 of nozzle 42.

The large-draw control technique is suitable for linear tool paths (e.g., tool path 78) and for curved tool paths having low to mid-levels of curvature or deflection (e.g., up to about 45 degrees from a linear path), and can provide consistent road heights. When the angle of curvature or deflection of a given road becomes excessive, however, a large amount of draw on flowable material 54 can pull the extruded road from its intended tool path, thereby reducing the angle of curvature. As can be appreciated, this problem can increase with the curvature or deflection of the tool path, such as at a corner vertex. In this situation, the extrusion rate of flowable material 54 and tip height 60 are desirably set to reduce or eliminate the draw.

Figure 8A:
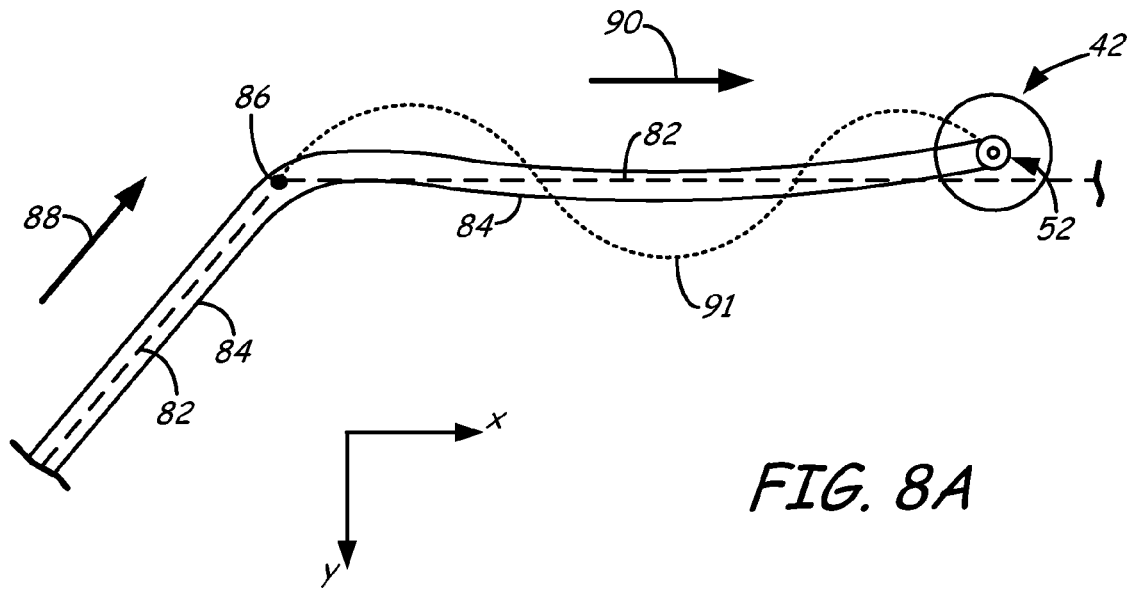
FIG. 8A is a bottom view of the nozzle producing an extruded road along a tool path having a corner vertex.

FIG. 8A illustrates nozzle 42 extruding flowable material 54 while moving along tool path 82 to produce road 84, where tool path 82 turns at corner vertex 86. As nozzle 42 moves along tool path 82 in the direction of arrow 88, bottom face 52 may be maintained at a tip height 60 that is about twice the intended road height (due to draw). This provides a large amount of draw for extruded road 84, as discussed above for linear tool path 78 (shown in FIG. 7).

However, if this large controlled draw is maintained while nozzle 42 turns at corner vertex 86, the tension on the extruded road 84 bending around corner vertex 86 would pull road 84 into the concave side of corner vertex 86. This would undesirably reduce the sharpness of the corner at corner vertex 86. Instead, just prior to reaching corner vertex 86, the draw may be controllably reduced to about zero. For example, as shown by plot line 89 in FIG. 8B, the height of bottom face 52 can be lowered from tip height 60 down to about road height 64 at corner vertex 86 ($V_{corner}$).

Suitable heights for nozzle 42 to be lowered down to during this staking range from about 90% to about 120% of road height 64, with particularly suitable heights ranging from about 100% to about 110% of road height 64, and with an even more particularly suitable height being about 100% of road height 64. This stakes the extruded flowable material 54 at corner vertex 86, while substantially maintaining the same road height 64 for road 84. This vertex staking technique is particularly suitable for use with a print head assembly disclosed in Swanson et al., U.S. Patent Application Publication No. 2012/0164256, which can include a voice coil-based mechanism to servo nozzle 42 with high precision along the z-axis.

As nozzle 42 passes corner vertex 86, the volumetric flow rate of flowable material 54 and/or the tip velocity of nozzle 42 may be held substantially constant. As illustrated above in Equations 4-6, lowering nozzle 42 down to about road height 64 increases the pressure below nozzle 42, which can reduce the controlled draw of the extruded road 84 to about zero at corner vertex 86. As also illustrated in Equations 4-6, the increased the pressure below nozzle 42 also generates a large push droplet. Due to lowered height of nozzle 42, the extra material produced at the push droplet is pressed radially outward into the convex side of corner vertex 86, which has been found to sharpen the corner.

After turning at corner vertex 86, nozzle 42 moves along tool path 82 in the direction of arrow 90 (shown in FIG. 8A). As further shown in FIG. 8B, after passing corner vertex 86, nozzle 42 may be raised back up to tip height 60 (i.e., about twice road height 64). This again provides a large amount of draw for extruded road 84, as discussed above for linear tool path 78. The staking of road 84 at corner vertex 86 effectively anchors road 84, which reduces or eliminates the pulling of road into the concave side of corner vertex 86. Accordingly, controllably generating a large draw for the linear and low-moderately curved roads, combined with this vertex staking technique at corner vertices or other locations that are highly curved, provides smooth stable roads with sharp corners.

Additionally, depending on the design of head gantry 20 (shown in FIG. 1), after passing corner vertex 86, the actual trajectory of nozzle 42 may wobble around the intended tool path 82 at a high frequency, as illustrated by trajectory 91 (shown in FIG. 8A). This tends to produce extruded roads that also wobble around the intended tool path 82.

However, the anchor of road 84 at corner vertex 86 also dampens or eliminates the effects of these high-frequency wobbles. When nozzle 42 moves past corner vertex 86 in the direction of arrow 90 and the draw is controllably increased, the shear between bottom face 52 and the extruded flowable material 54 creates tension on road 84 between nozzle 42 and the anchor at corner vertex 86. This tension straightens road 84, thereby reducing the high-frequency wobble of trajectory 91.

Figure 8B:
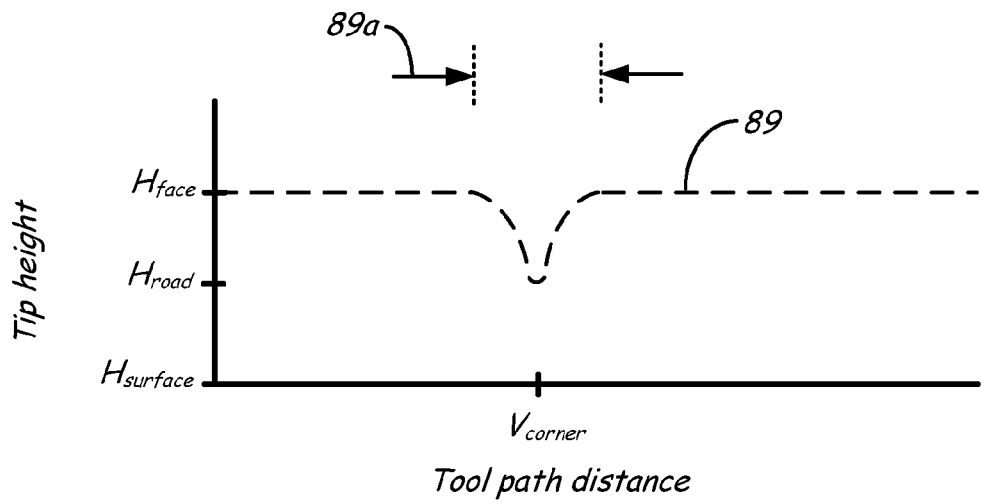
FIG. 8B is a graphical illustration of tip height versus tool path distance for the example shown in FIG. 8A.

As further illustrated in FIG. 8B, nozzle 42 may begin to lower down from tip height 60 down to about road height 64 prior to reaching corner vertex 86, and begin to raise back up to tip height 60 after passing corner vertex 86. This dip in plot line 89, referred to as staking range 89a, may vary depending on factors such as the tip velocity of nozzle 42 and the deflection angle at corner vertex 86. For example, at the leading segment of staking range 89a (prior to reaching corner vertex 86), nozzle 42 may begin lowering down from tip height 60 at zero millimeters along the tool path from corner vertex 86. Similarly, at the trailing segment of staking range 89a (after passing corner vertex 86), nozzle 42 may be raised back up to tip height 60 within about fifty millimeters along the tool path from corner vertex 86.

In some embodiments, the extent that bottom face 52 is lowered down from tip height 60 may be proportional to the centripetal acceleration applied to nozzle 42 as head gantry 20 moves print head 18 around corner vertex 86. For example, in this embodiment, if a tool path only deflects by a small angle at a corner vertex, bottom face 52 can be lowered by a small amount (rather than all the way down to road height 64). However, if the tool path deflects by a large angle at a corner vertex (e.g., about 90 degrees or greater), bottom face 52 can be lowered all the way down to road height 64. Inbetween the small and large deflection angles, the height that bottom face 52 is lowered down to may vary based on a gradient that is proportional to the given deflection angle.

The vertex staking technique is also suitable when nozzle 42 reaches a stop vertex of a tool path. FIG. 9A illustrates nozzle 42 extruding flowable material 54 while moving along tool path 92 to produce road 94, where tool path 92 stops at stop vertex 96. Stop vertex 96 is the ending point for tool path 92, where nozzle 42 moves along tool path 92 in the direction of arrow 98 to produce road 94 until stop vertex 96 is reached.

At this point, the extrusion rate is reduced to zero. However, if nozzle 42 remained at tip height 60 at stop vertex 96, the reduced extrusion rate could lead to under fill road 94 at stop vertex 96. This can lead to an under-filled seam for a perimeter road. Instead, as shown by plot line 99, reducing the draw toward zero by lowering nozzle 42 down to about road height 64 at stop vertex 96 ($V_{stop}$), along with the reduction in the extrusion rate, allows a sufficient amount of flowable material 54 to reside at the end point for road 94.

Suitable heights for nozzle 42 to be lowered down to during end-point staking are in the same range as given above for vertex staking. Staking at stop vertex 96 provides a filled end point for road 94, and provides good seam control.

A modified version of this vertex staking technique may be used for a start vertex of a tool path. For example, FIG. 10A illustrates nozzle 42 extruding flowable material 54 while moving along tool path 100 to produce road 102, where tool path 100 begins at start vertex 104. Start vertex 104 is the starting point for tool path 100, where nozzle 42 begins extruding flowable material 54, and then moves along tool path 100 in the direction of arrow 106 to produce road 102.

In this situation, nozzle 42 may initially be positioned at start vertex 104. As shown by plot lines 107a and 107b in FIG. 10B, nozzle 42 is then desirably lowered down to about the height of the surface of the previous layer (e.g., surface 62) at start vertex 104 ($V_{start}$). Suitable heights for nozzle 42 to be lowered down to during start-point staking range from about 100% to about 120% of the height of surface 62, with particularly suitable heights ranging from about 100% to about 110% of the height of surface 62, and with an even more particularly suitable height being about 100% of the height of surface 62.

Controller 34 may then direct print head 18 to begin extruding flowable material 54 from nozzle 42 while moving along tool path 100 in the direction of arrow 106. Upon leaving start vertex 104, the height of nozzle 42 is raised to tip height 60 (i.e., about twice road height 64). This provides a large amount of controlled draw for extruded road 102, as discussed above for linear tool path 78.

Plot lines 107a and 107b illustrate different profiles that nozzle 42 may follow at start vertex 104, defining staking range 107c. For example, plot line 107a has nozzle 42 rising upward along the z-axis (e.g., up to road height 64) prior to any movement along tool path 100. Alternatively, plot line 107b has nozzle 42 starting to rise upward along the z-axis and to move along tool path 100 at substantially the same time.

A comparison of the applications of the vertex staking technique to corner, start, and stop vertices, shows that at each vertex, nozzle 42 is lowered down to the existing surface of the 3D part. For corner and stop vertices, the existing surface is the road being extruded. As such, in these instances, nozzle 42 is lowered down to road height 64. However, for a start vertex, the existing surface is the surface of the previous layer (e.g., surface 62). As such, in this instance, nozzle 42 is lowered down to the surface of the previous layer.

Figure 11:
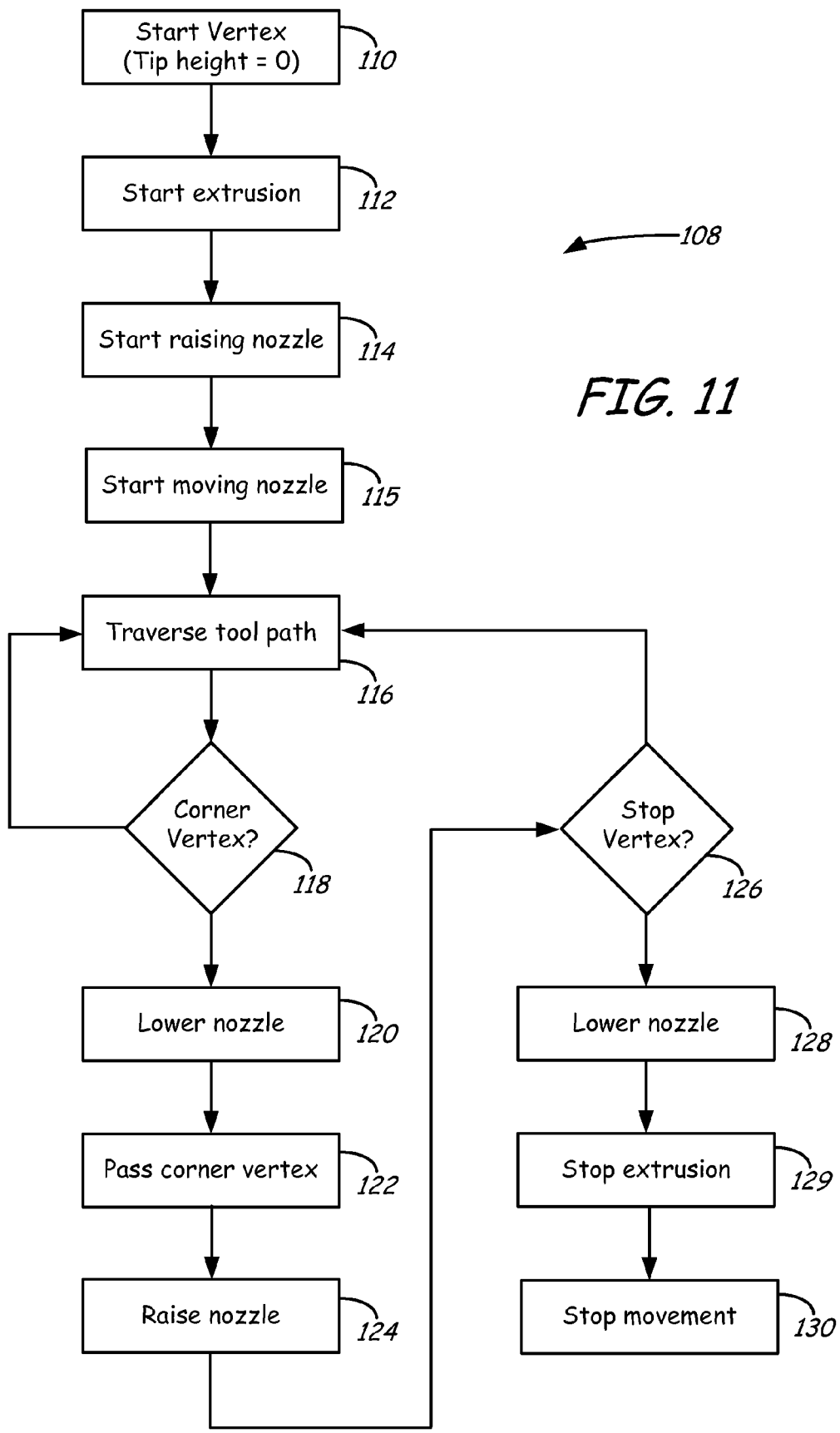
FIG. 11 is a flow diagram of a method for producing an extruded road with a staking technique.

FIG. 11 is a flow diagram of method 108, which is an example method for performing the vertex staking technique along a tool path of a layer of a 3D part or support structure. The following discussion of method 108 is made with reference to system 10, with the understanding that method 108 may be performed by any suitable extrusion-based additive manufacturing system.

As shown, method 108 includes steps 110-130, and initially involves moving the nozzle over to a start vertex for the tool path, and setting the height of the planar bottom face of the tip annulus of the nozzle to about the height of the surface of the previous layer (or platform) (step 110). For example, controller 34 may direct platen gantry 16 to raise platen 14 to a desired height within chamber 12, and may direct head gantry 20 to move print head 18 such that nozzle 42 is positioned in the x-y plane at the location of the start vertex of the tool path (e.g., start vertex 104).

Controller 34 may also position nozzle 42 at about the height of the surface of the previous layer of 3D part 26 (or platen 14), such as from about 100% to about 120% of the height of surface 62. This may be performed by raising platen 14 to the particular height, or, more desirably, by toggling the appropriate liquefier assembly 40 and nozzle 42 (of extrusion head 18) down to about the surface height.

Controller 34 may then direct print head 18 to start extruding the flowable material from nozzle 42 (step 112). This may involve feeding a consumable filament of a part or support material to liquefier assembly 40 (e.g., via drive mechanism 38), melting the filament in liquefier assembly 40, and extruding the resulting flowable material through nozzle 42, as discussed above.

Controller 34 may also begin raising nozzle up to the intended tip height (e.g., tip height 60) (step 114) and directing head gantry 20 to start moving print head 18 and nozzle 42 along the tool path from the start vertex (step 115). In some embodiments, steps 112, 114, and/or 116 may be performed in a substantially simultaneous manner such that nozzle 42 is raised and begins moving along the tool path from the start vertex while starting the extrusion, such as discussed above for plot lines 107a and 107b (shown in FIG. 10B). While extruding the flowable material at a suitable extrusion rate and traversing along the tool path (step 116), nozzle 42 is desirably maintained at tip height 60 to produce a large amount draw. This produces an extruded road having road height 64 and draw height 66.

Just prior to reaching a corner vertex having a suitable deflection angle (e.g., corner vertex 86) (step 118), controller 34 may direct nozzle 42 to be lowered down, such as to the road height of the extruded road (e.g., road height 64) while maintaining the same extrusion rate (step 120). For example, if the deflection angel of the corner vertex is large, nozzle 42 may be served down to a height ranging from about 90% to about 120% of road height 64. This reduces the draw height (e.g., draw height 66) to about zero. As nozzle 42 turns and passes the corner vertex at the lowered height (step 122), the lowered nozzle 42 stakes the flowable material at the corner vertex, thereby providing a sharp corner for the extruded road, as well as an anchor for reducing the effects of high-frequency wobble on nozzle 42.

Upon passing the corner vertex, controller 34 may direct nozzle 42 to be raised (e.g., by toggling liquefier assembly 40 and nozzle 42) back up to tip height 60 to again produced a large amount of draw (step 124). Steps 116-124 may then be continued until the stop vertex for the given tool path is reached (step 126). At this point, controller 34 may direct nozzle 42 to be lowered down to the road height of the extruded road (e.g., road height 64) (step 128). For example, nozzle 42 may be served down to a height ranging from about 90% to about 120% of road height 64. Controller 34 may also stop the extrusion (step 129), and stop the movement of nozzle 42 (step 130). This produces a good seam fill at the location of the stop vertex. Method 108 may then be repeated for each tool path to produce a 3D part or support structure having good surface quality.

Draw Control with Feedback

In addition to the above-discussed vertex staking technique, the draw on the extruded roads can be further controlled by detecting the amount of draw being produced and compensating for any deviations from the intended draw amounts. These feedback draw control techniques can generally be divided into real-time feedbacks and post-road or layer feedbacks.

Figure 12:
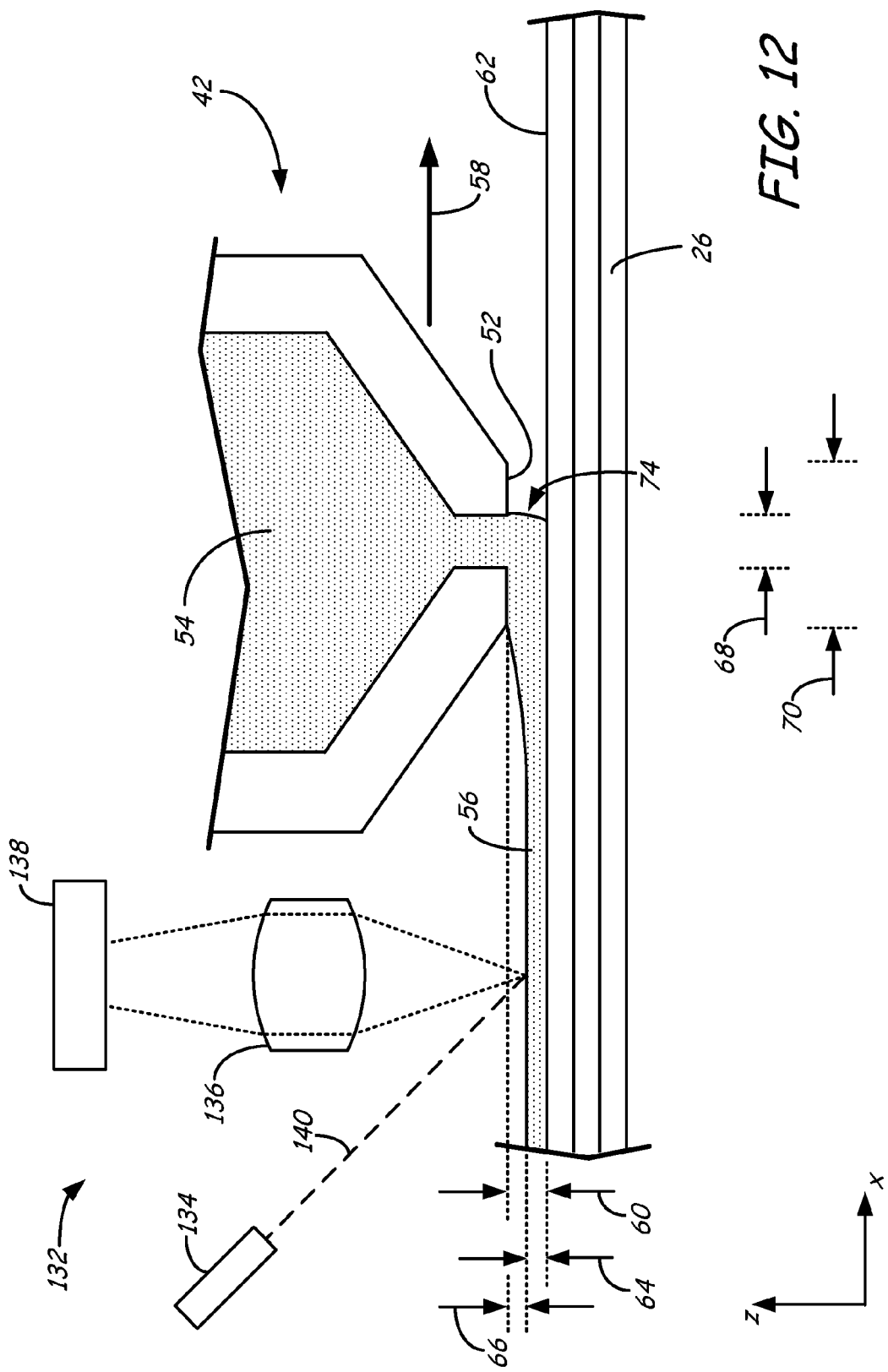
FIG. 12 is a side view of the nozzle producing roads in a layer-by-layer manner to print a 3D part, which includes an optical assembly for monitoring draw.
Figure 13:
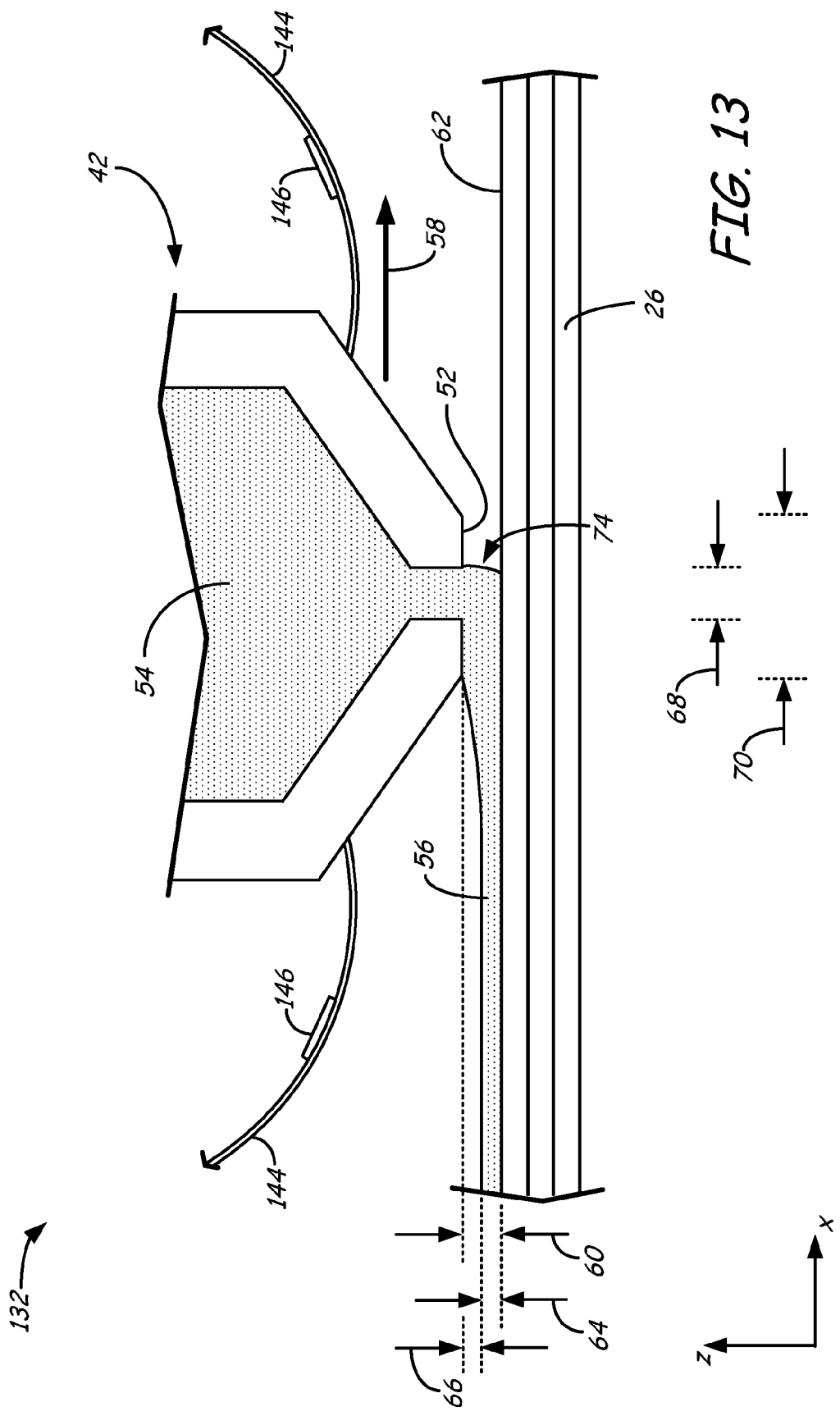
FIG. 13 is a side view of the nozzle producing roads in a layer-by-layer manner to print a 3D part, which includes a proximity capacitance sensor for monitoring draw.

FIGS. 12 and 13 illustrate examples of suitable draw control techniques with real-time feedback, which are based on measuring the road heights of the extruded roads in a non-contact manner. FIG. 12 shows nozzle 42 in use with optical assembly 132, where optical assembly 132 may be mounted to and carried with print head 18. In the shown embodiment, optical assembly 132 includes light source 134, lens 136, and detector 138. Light source 134 emits a collimated light beam 140 toward the recently extruded road 56, away from normal incidence. The reflected portion of the light beam is then directed by lens 136 toward detector 138.

Detector 138 may be any suitable optical detector, such as a video camera, a position-sensing photodiode, and the like, where detector 138 is calibrated to identify a signal corresponding to a particular road or surface height. In an alternative to detector 138, a confocal microscope may be utilized, where a pinhole at the image plane of lens 136 may be relayed to a focal volume in the object space. A surface close to that focal volume z-interface can then reflect light through the pinhole. This also allows the particular road or surface height to be measured.

FIG. 13 shows nozzle 42 in use with proximity capacitance sensor 142, which is mounted near nozzle 42. Capacitance sensor 142 includes an insulating shield 144 (e.g., a TEFLON fluoropolymer shield) and an electrode 146 secured to the top-side around shield 144. Capacitance sensor 142 may also include a variety of additional electronic components (not shown) for processing and transmitting capacitance signals. Capacitance sensor 142 generates an electrical field that detects the amount of extruded material at the leading edge of nozzle 42 and at the trailing edge of nozzle 42, based on the dielectric constant of the extruded material. This difference the detected amounts is calibrated to correspond to a given road height.

Because optical assembly 132 and proximity capacitance sensor 142 are capable of providing rapid and continuous measurements, these devices can provide continuous real-time feedback on the draw amounts. In addition, these measurements are non-contact in nature, allowing them to be performed before road 56 fully solidifies (e.g., within one second of extrusion, or faster). Based on these detections, the extrusion rate of flowable material 54 and/or the height of nozzle 42 may be adjusted to control the intended amount of draw on road 56. For example, if the detected roads are becoming too large, the height of nozzle 42 may be raised by a small amount and/or the extrusion rate of flowable material 54 may be reduced to increase the draw.

Figure 14:
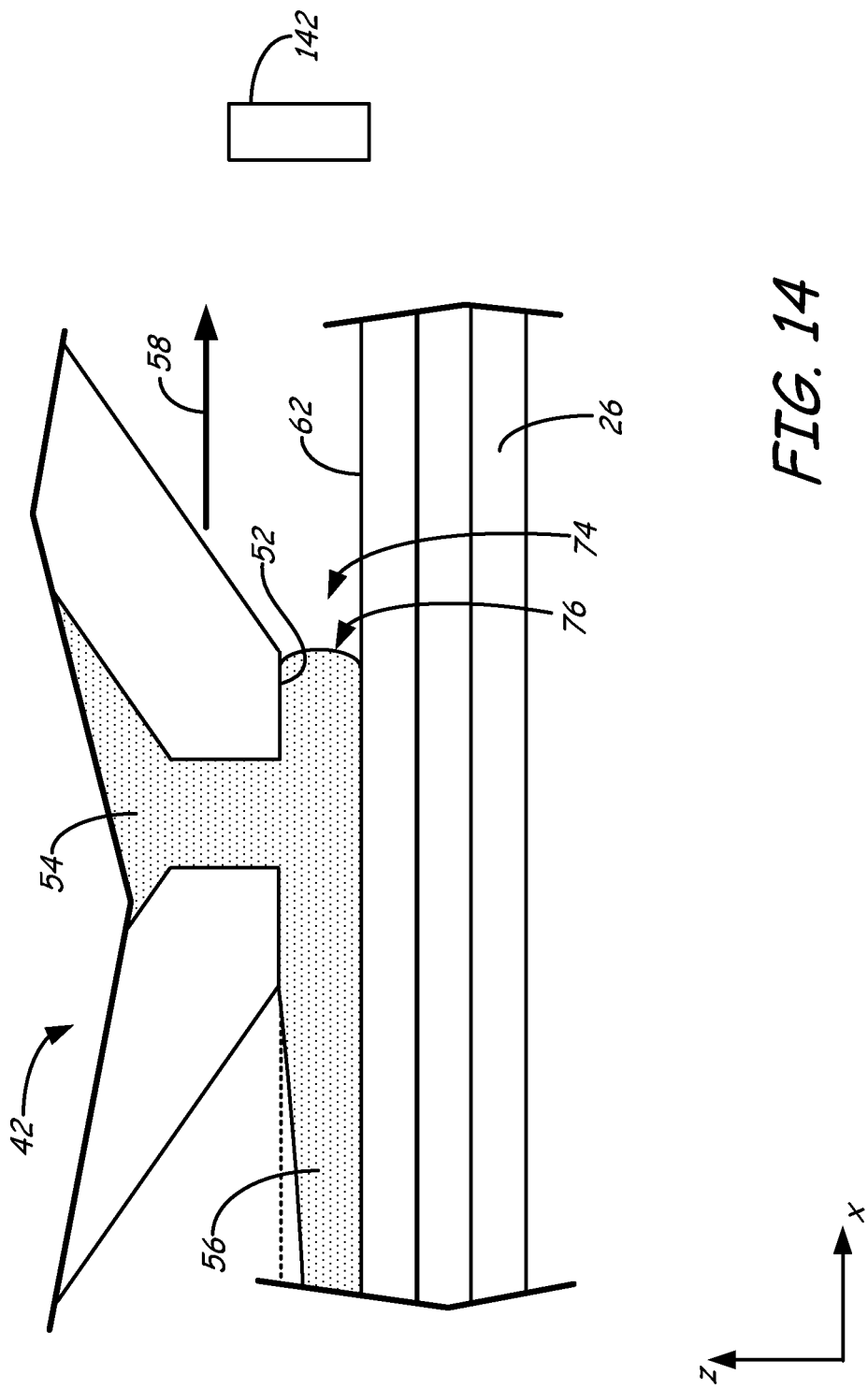
FIG. 14 is a side view of the nozzle producing roads in a layer-by-layer manner to print a 3D part, which includes a video detector for monitoring push droplets.

FIG. 14 shows nozzle 42 in use with video assembly 142 for producing road 56. Video assembly 142 is one or more video detectors configured to monitor the size of any generated push droplet (e.g., push droplet 76) below nozzle 42. As illustrated above in Equations 4-6, the size of push droplet 76 is proportional to the pressure below nozzle 42, which is correspondingly inversely proportional to the amount of the controlled draw. As such, based on the detected size of push droplet 76, the extrusion rate of flowable material 54 and/or the height of nozzle 42 may be adjusted to control the size of push droplet 76 (e.g., maintain the size of push droplet 76 below a threshold value).

The above-discussed techniques are examples of suitable real-time feedback techniques. Alternatively, a variety of different real-time feedback techniques may be used, such as air gaging and other pressure-based measurement techniques. For example, in some embodiments, back pressures applied to the filaments may be detected by the torque on the drive mechanisms 38. Under any of the these techniques, if the height of a detected road reaches an unacceptable level, requiring controller 34 to adjust the extrusion rate of flowable material 54 and/or the height of nozzle 42, controller 34 may also record the location of the potential asperity. Controller 34 may then compile a local reduction in the extrusion at that same location in the x-y plane for the subsequent layer to prevent the asperity from propagating.

For draw control techniques that are based on post-road or layer feedback, the feedback measurements are performed after the solidification of a road or an entire layer. In one embodiment, after a given road or layer has solidified, nozzle 42 or other z-axis measurement device (e.g., a touch probe) may be used to contact (e.g., tap) the solidified road or layer to measure the height at one or more locations. This produces a topography profile of the road or layer, which may then be compared to the predicted road or layer heights to identify any deviations. Alternatively, the produced road or layer may be optically scanned to produce the topography profile of the road or layer.

Based on the topography profile, controller 34 may then compile corrections in the extrusion for the subsequent layer to correct for any deviations. Alternatively, if the detected deviations identify local voids in the layer, controller 34 may then direct print head 18 to re-traverse the tool paths in these detected void regions and fill them prior to following the tool paths for the subsequent layer. This can increase the part density and reduce the risk of z-strength failures.

Nozzle Geometry

The above-discussed vertex staking and feedback techniques are suitable for use with a variety of different nozzles, such as conventional, single-annulus nozzles. In an alternative embodiment, the amount of draw and the size of any generated push droplets may be controlled to conform to particular extrusion tip geometries. For example, as discussed in co-filed U.S. patent application Ser. No. 13/587,002, entitled "Print Head Nozzle For Use With Additive Manufacturing System", nozzle 42 may be replaced with an nozzle having an inner ring, and outer ring, and at least one recessed groove located circumferentially between the inner ring and the outer ring. In this embodiment, controller 34 may direct print head 18 to adjust the volumetric flow rate of the flowable material that is extruded from nozzle 42, adjust the velocity of nozzle 42, or a combination thereof, to produce extruded roads having different road widths As such, in this embodiment, controller 34 may adjust the extrusion rate of the flowable material depending on the desired road width along a given tool path. This embodiment may be used in combination with the above-discussed vertex staking and feedback techniques to produce 3D parts and support structures having good surface quality, along with extruded roads having different road widths.

EXAMPLES

The present disclosure is more particularly described in the following examples that are intended as illustrations only, since numerous modifications and variations within the scope of the present disclosure will be apparent to those skilled in the art.

Example 1

Linear Tool Path

Printing operations of Example 1 were performed along linear tool paths (corresponding to the process shown above in FIGS. 7A and 7B) with a print head nozzle corresponding to nozzle 42, which had a bottom face with an inner diameter of 0.4 millimeters (0.016 inches) and an outer diameter of 0.8 millimeters (0.03 inches). The nozzle was mounted in an additive manufacturing system commercially available from Stratasys, Inc., Eden Prairie, Minn. under the trademarks "FDM" and "FORTUS 400mc". During the print operation, the bottom face of the nozzle was maintained at two times the height of the intended sliced layer increment.

During each printing operation, a thermoplastic part material was extruded from the nozzle at a constant volumetric flow rate while the nozzle was moved along the linear tool path at a constant velocity to maintain a substantially zero gauge pressure below the nozzle. This was confirmed by the lack of any large push droplet at the leading edge of the nozzle.

The resulting extruded road had good, smooth sidewalls with no rippling, and exhibited a road height of about one-half of the tip height of the bottom face of the nozzle, corresponding to the sliced layer increment. This was due to the draw effect on the road controlled by the increased tip height of the nozzle. These printing operations were then repeated for multiple layers of each 3D part. After completion, the surfaces of the 3D parts were visually inspected and did not exhibit cresting.

Example 2

Tool Path with Corner Vertex

Printing operations of Example 2 were performed along tool paths having linear segments deflected at corner vertices (corresponding to the process shown above in FIGS. 8A and 8B). These printing operations were performed with the same print head nozzle set up used in Example 1, and the tested corner vertices had a variety of different deflection angles.

During each printing operation, the nozzle initially followed a linear tool path segment prior to reaching the given corner vertex. While traversing the linear segment, the bottom face of the nozzle was maintained at an initial tip height of two times the height of the intended sliced layer increment, and a thermoplastic part material was extruded from the nozzle at a constant volumetric flow rate while the nozzle was moved along the linear tool path at a constant velocity to maintain a substantially zero gauge pressure below the nozzle.

Just prior to reaching the corner vertex, the height of the nozzle was lowered from the initial tip height such that, upon reaching the corner vertex, the height of the bottom face of the nozzle was at the height of the intended sliced layer increment and the road height. The volumetric flow rate and the nozzle or tip velocity were unchanged. Thus, the lowered nozzle height increased the pressure below the nozzle, causing the extruded part material to press radially outward into the convex side of the corner vertex.

Upon passing the corner vertex, the height of the nozzle was raised back up to the initial tip height (i.e., two times the height of the intended sliced layer increment), and the nozzle then followed a second linear segment of the tool path. The volumetric flow rate and the nozzle or tip velocity remained unchanged.

For each printing operation, the resulting extruded road along both linear segments had good, smooth sidewalls with no rippling, and exhibited a road height of about one-half of the tip height of the bottom face of the nozzle, corresponding to the sliced layer increment. The road also exhibited a good sharp corner with little or no pulling into the concave side of the corner, and with little or no effect due to any high-frequency wobble of the nozzle. These printing operations were then repeated for multiple layers of each 3D part. After completion, the surfaces of the 3D parts were visually inspected and did not exhibit cresting along the linear segments, and exhibited good, sharp corners.

Example 3

Tool Path with Start and Stop Vertices

Printing operations of Example 3 were each performed along an enclosed perimeter tool path from a start vertex (corresponding to the process shown above in FIGS. 10A and 10B) to a stop vertex (corresponding to the process shown above in FIGS. 9A and 9B). The start and stop vertices were adjacent to each other to define a seam for the perimeter tool path. These printing operations were also performed with the same print head nozzle set up used in Example 1.

During each printing operation, the nozzle was initially lowered to the platen surface (or to the surface of the previous layer) at the location of the start vertex. The nozzle was then raised and began extruding a thermoplastic part material, and began moving along the tool path from the start vertex. Promptly after leaving the start vertex, the nozzle reached a tip height of two times the height of the intended sliced layer increment. The thermoplastic part material was extruded from the nozzle at a constant volumetric flow rate while the nozzle was moved along the tool path at a constant velocity.

Just prior to reaching the stop vertex, the height of the nozzle was lowered from the raised tip height such that, upon reaching the stop vertex, the height of the bottom face of the nozzle was at the height of the intended sliced layer increment and the road height. Upon reaching the stop vertex, the volumetric flow rate and the nozzle or tip velocity were reduced to zero to stop the nozzle at the stop vertex.

For each printing operation, the resulting road exhibited a good fill at the start and end points of the road. This provided a good seam at the intersection of the start and stop vertices, allowing the resulting road to function as an enclosed perimeter road for a 3D part layer, thereby reducing porosity at the seam.

Although the present disclosure has been described with reference to preferred embodiments, workers skilled in the art will recognize that changes may be made in form and detail without departing from the spirit and scope of the disclosure.

The invention claimed is:

1. A method for improving part quality for a printed three-dimensional part, the method comprising:
   providing a print head retained by an extrusion-based additive manufacturing system, the print head comprising a nozzle; and
   moving the nozzle along a substantially linear segment of a tool path at a tip height above a previous layer of the three-dimensional part while extruding a flowable material;
   producing an extruded road from the extruded flowable material having a road height above the previous layer, and wherein the tip height ranges from about 150% to about 250% of the road height due at least in part to draw on the extruded road, wherein the printed three-dimensional part is substantially free of surface cresting.

2. The method of claim 1, wherein the tip height ranges from about 175% to about 225% of the road height.

3. The method of claim 1, wherein the tool path comprises a corner vertex, and where the method further comprises:
   lowering the moving nozzle down from the tip height such that, upon reaching the corner vertex, the moving nozzle is at a height ranging from about 90% to about 120% of the road height; and
   raising the moving nozzle up to the tip height after passing the corner vertex.

4. The method of claim 3, wherein the flowable material is extruded from the moving nozzle at a substantially constant volumetric flow rate as the moving nozzle passes the corner vertex.

5. The method of claim 1, wherein the tool path comprises a start vertex, and wherein the method further comprises:
   positioning the nozzle at the start vertex;
   lowering the nozzle to a lowered height that ranges from about 100% to about 120% of a height of the previous layer;
   starting the movement of the nozzle from the start vertex along the tool path;
   while starting the movement of the nozzle from the start vertex, starting the extrusion of the flowable material from the extrusion tip; and
   prior to or while starting the movement of the extrusion tip from the start vertex, raising the nozzle at least part way from the lowered height to the tip height.

6. The method of claim 1, wherein the tool path comprises a stop vertex, and where the method further comprises:
   lowering the nozzle down from the tip height such that, upon reaching the stop vertex, the nozzle is at a height ranging from about 90% to about 120% of the road height;
   reducing the extrusion of the flowable material such that, when the nozzle reaches the stop vertex, the extrusion is stopped; and
   stopping the movement of the nozzle along the tool path at the stop vertex.

7. The method of claim 1, wherein the nozzle comprises a tip pipe having a longitudinal length and a diameter, and wherein a ratio of the longitudinal length to the diameter is less than 2:1 or is greater than 4:1.

8. The method of claim 1, wherein the nozzle comprises an inner ring, an outer ring, and at least one annular groove located circumferentially between the inner ring and the outer ring, and wherein the method further comprises adjusting a volumetric flow rate of the flowable material extruded from the nozzle to adjust a road width of the extruded road.

9. A method for improving part quality for a printed three-dimensional part, the method comprising:
   providing a print head retained by the extrusion-based additive manufacturing system, the print head comprising a nozzle; and
   moving the nozzle along a tool path at a first tip height above a previous layer of the three-dimensional part;
   extruding a flowable material from the nozzle moving at the first tip height to produce a first portion of an extruded road having a first amount of draw;
   lowering the nozzle from the first tip height to a second tip height above the previous layer at a corner vertex of the tool path;
   moving the nozzle along the tool path at the second tip height;
   extruding the flowable material from the nozzle moving at the second tip height to produce a second portion of the extruded road having a second amount of draw lower than the first amount of draw or substantially no draw.

10. The method of claim 9, wherein the first tip height ranges from about 150% to about 250% of a road height of the first portion of the extruded road.

11. The method of claim 9, and further comprising;
   raising the nozzle from the second tip height up to the first tip height after the nozzle passes the corner vertex;
   moving the raised nozzle along the tool path at the first tip height;
   extruding the flowable material from the raised nozzle moving at the first tip height to produce a third portion of the extruded road having substantially the first amount of draw.

12. The method of claim 9, wherein the flowable material is extruded from the nozzle moving at the first tip height at a substantially the same volumetric flow rate as the flowable material extruded from the nozzle moving at the second tip height.

13. The method of claim 9, and further comprising:
positioning the nozzle at a start vertex;
lowering the nozzle to a lowered height that ranges from about 100% to about 120% of a height of the previous layer;
starting the movement of the nozzle from the start vertex along the tool path;
while starting the movement of the nozzle from the start vertex, starting the extrusion of the flowable material from the nozzle; and
prior to or while starting the movement of the nozzle from the start vertex, raising the extrusion tip from the lowered height to the first tip height.

14. The method of claim 9, and further comprising:
lowering the raised nozzle from the first tip height such that, upon reaching a stop vertex, the lowered height ranges from about 90% to about 120% of a road height of the extruded road;
reducing the extrusion of the flowable material such that, upon reaching the stop vertex, the extrusion is stopped; and
stopping the movement of the nozzle along the tool path at the stop vertex.

15. The method of claim 9, wherein the first and second portions of the extruded road have substantially the same road heights.

16. A method for improving part quality for a printed three-dimensional part, the method comprising:
providing a print head retained by an extrusion-based additive manufacturing system, the print head comprising a nozzle; and
moving the nozzle along a tool path above a previous layer of the three-dimensional part;
extruding a flowable material from the moving nozzle to produce an extruded road;
sensing draw levels of the extruded road; and
adjusting at least one extrusion setting based on the sensed draw levels to print the printed three-dimensional part substantially free of surface cresting, wherein the at least one extrusion setting is selected from the group consisting of a height of the moving nozzle, a velocity of the moving nozzle, and a volumetric flow rate of the flowable material extruded from the nozzle.

17. The method of claim 16, wherein sensing the draw levels comprises detecting a road height of the extruded road with at least one of an optical detector and a capacitance sensor.

18. The method of claim 16, wherein sensing the draw levels comprises contacting the extruded road to measure a road height of the extruded road.

19. The method of claim 18, wherein contacting the extruded road comprises touching the extruded road with the nozzle.

* * * * *